April 19, 1938.  W. M. INGRAM  2,114,304
SQUARE TEA BAG MACHINE
Filed Oct. 17, 1933  29 Sheets-Sheet 5
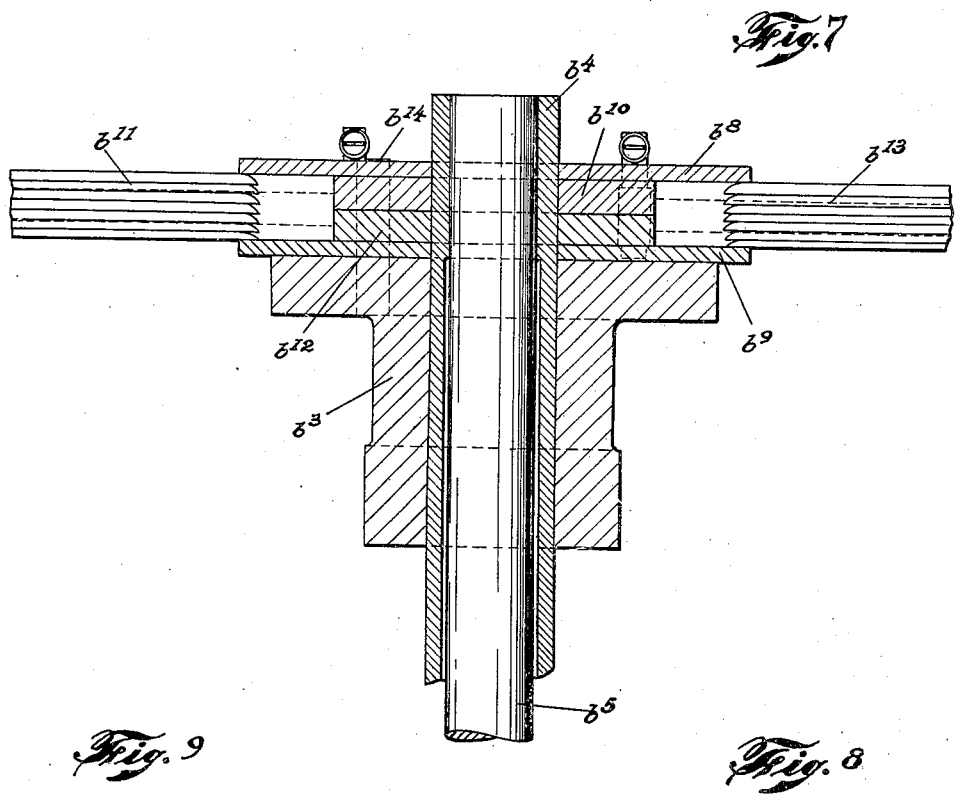
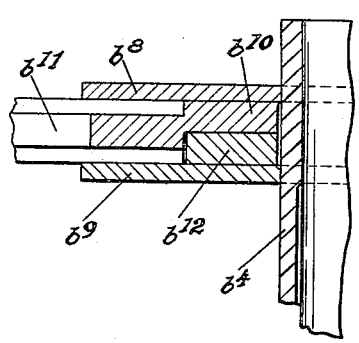  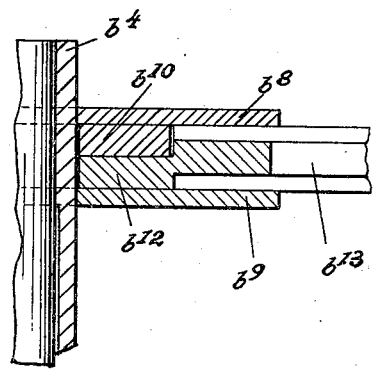
INVENTOR
WALTER M. INGRAM
BY
ATTORNEYS April 19, 1938.　　　W. M. INGRAM　　　2,114,304
SQUARE TEA BAG MACHINE
Filed Oct. 17, 1933　　　29 Sheets-Sheet 6
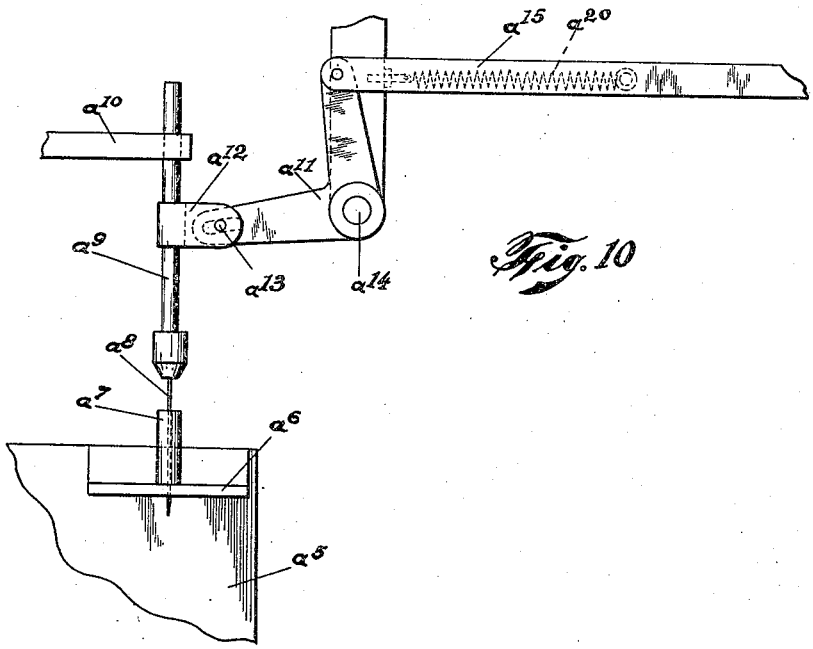
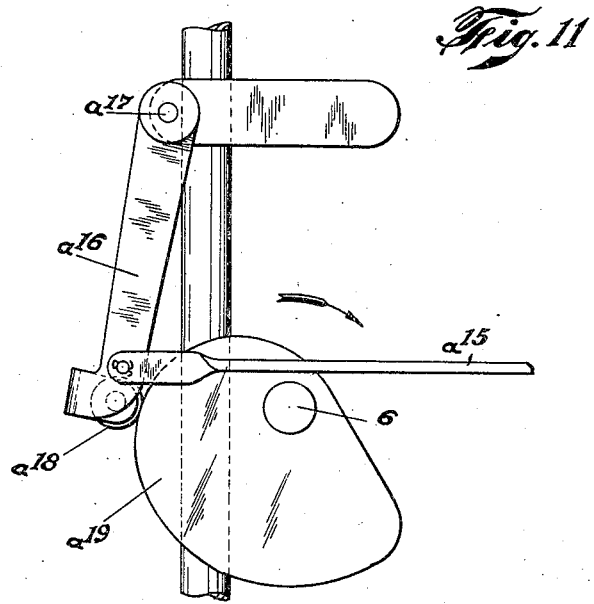
INVENTOR
WALTER M. INGRAM
BY
ATTORNEYS

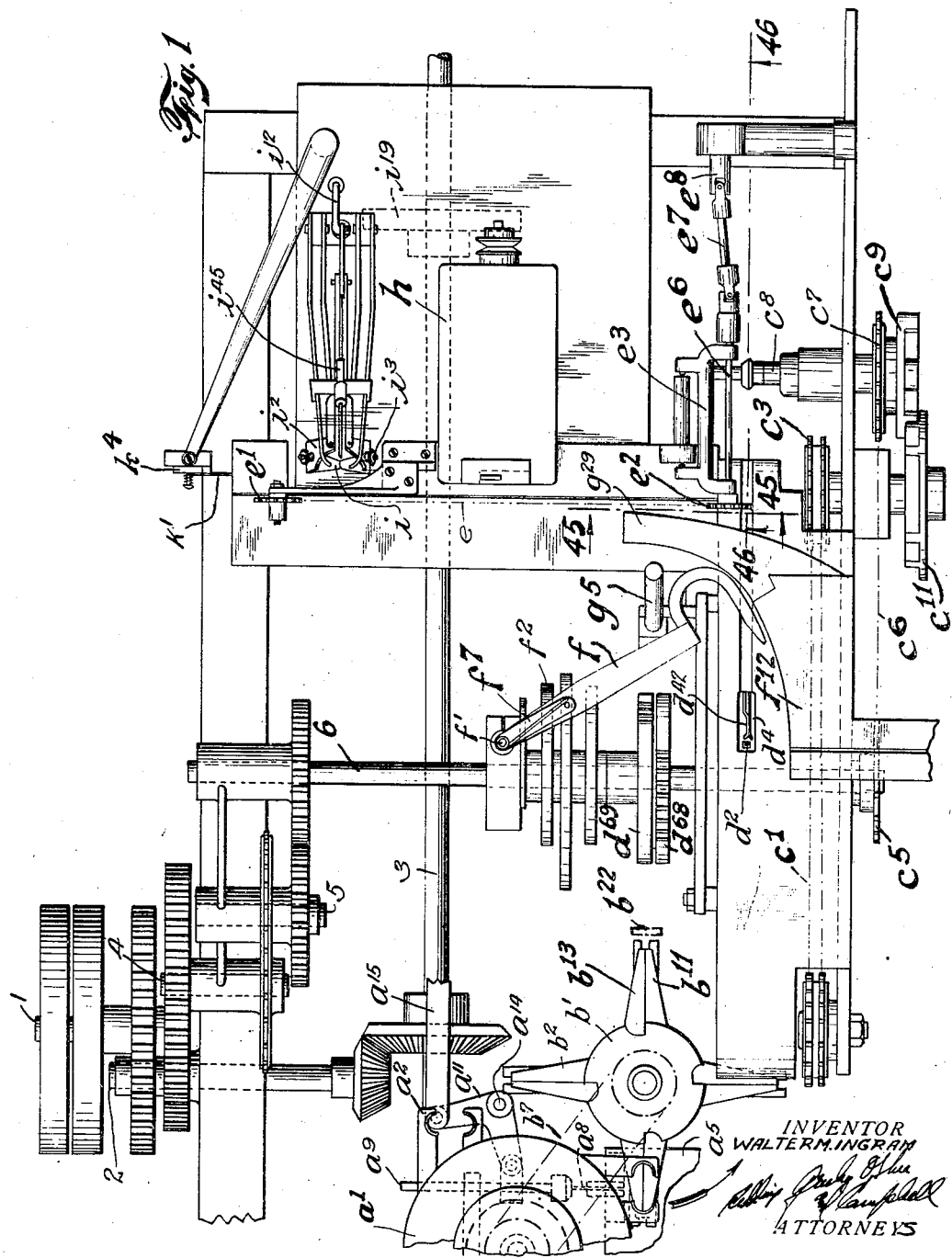

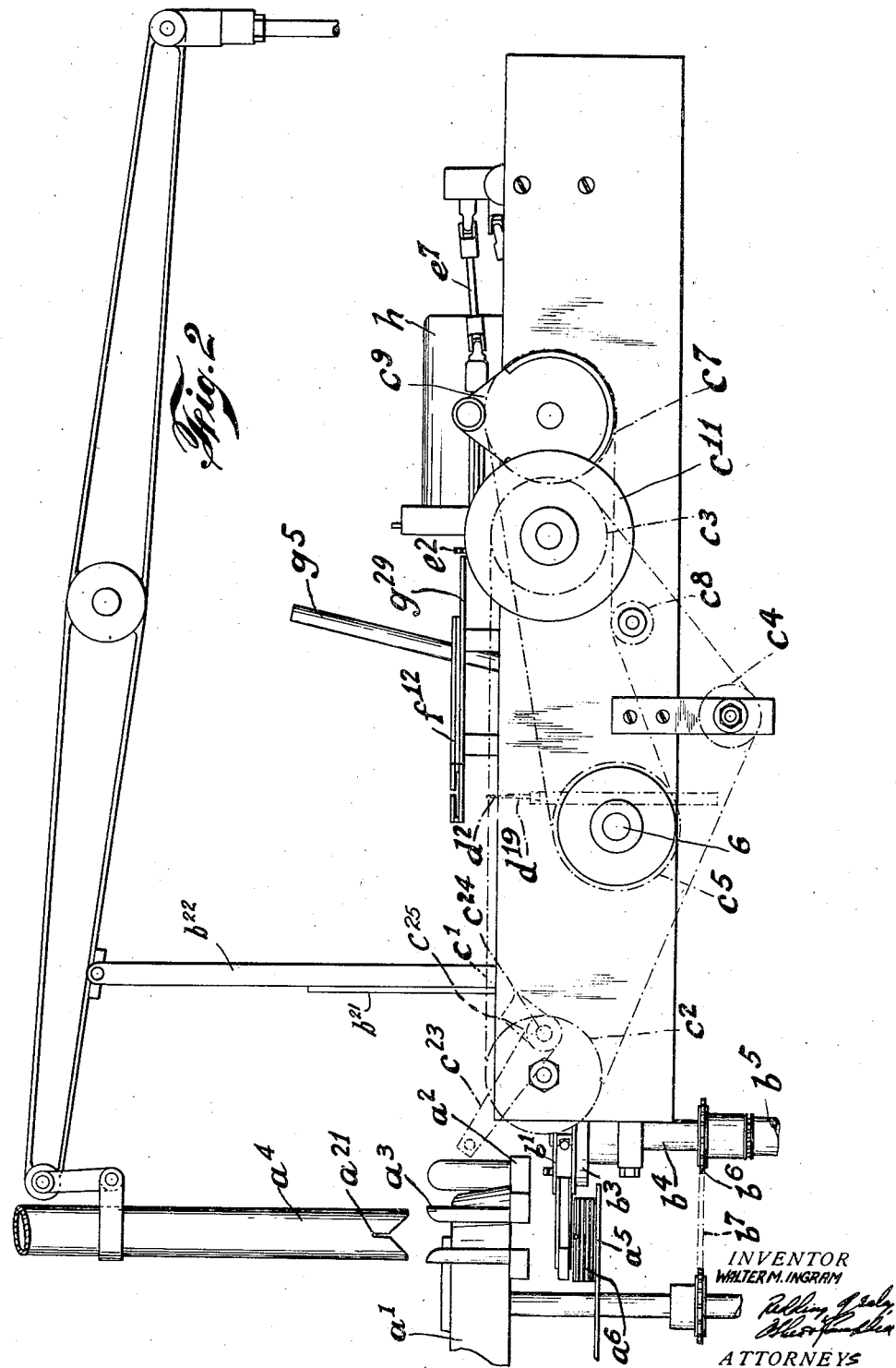

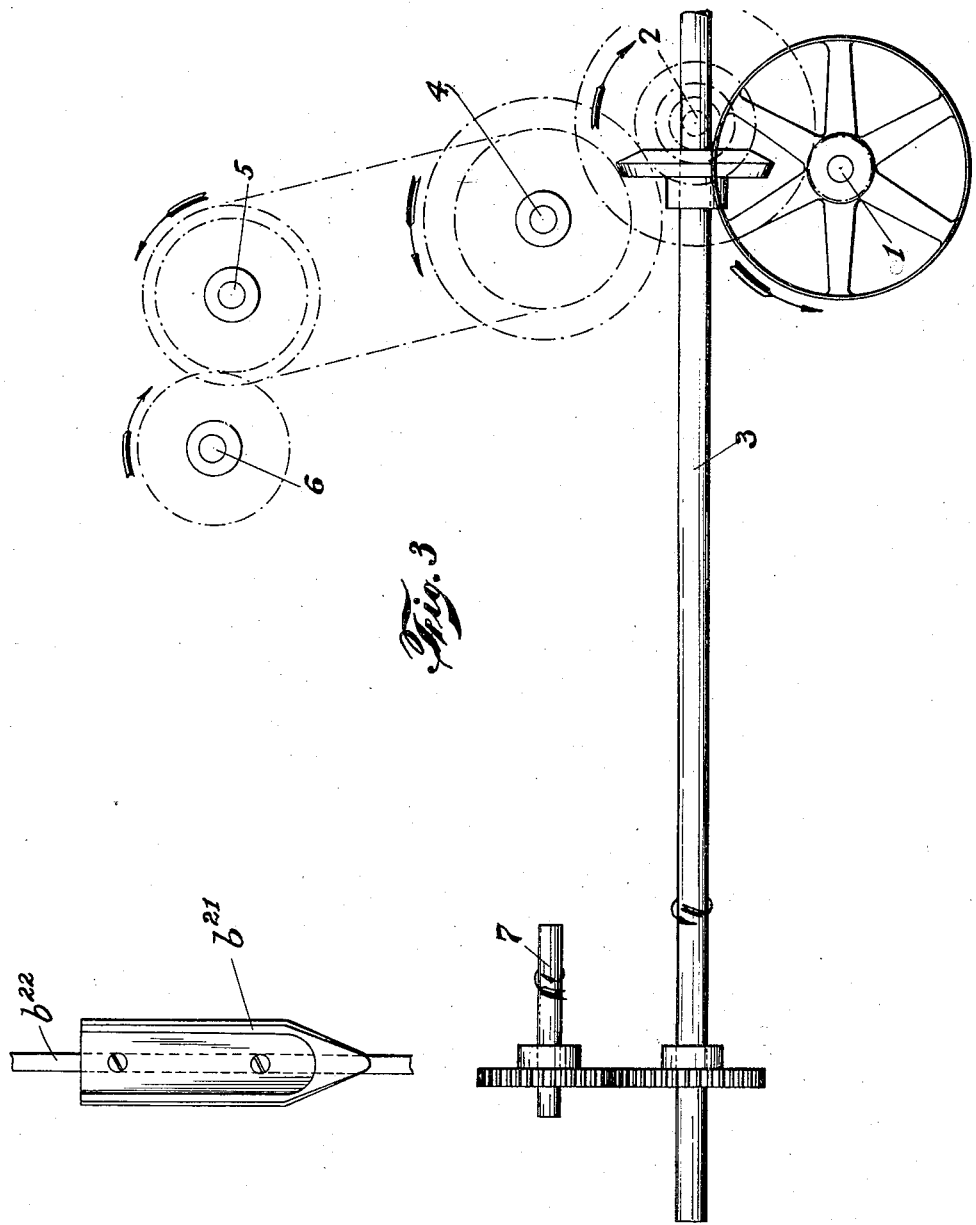

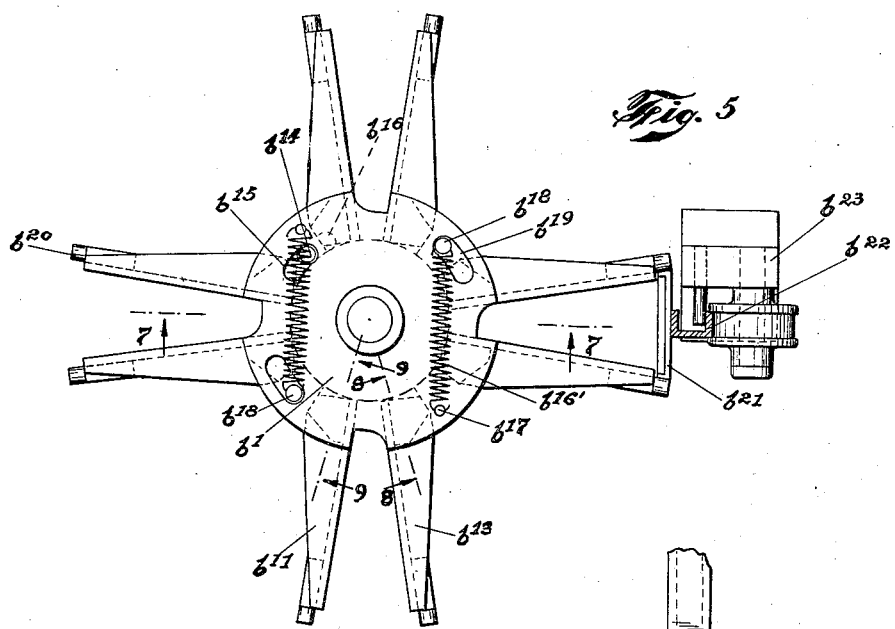
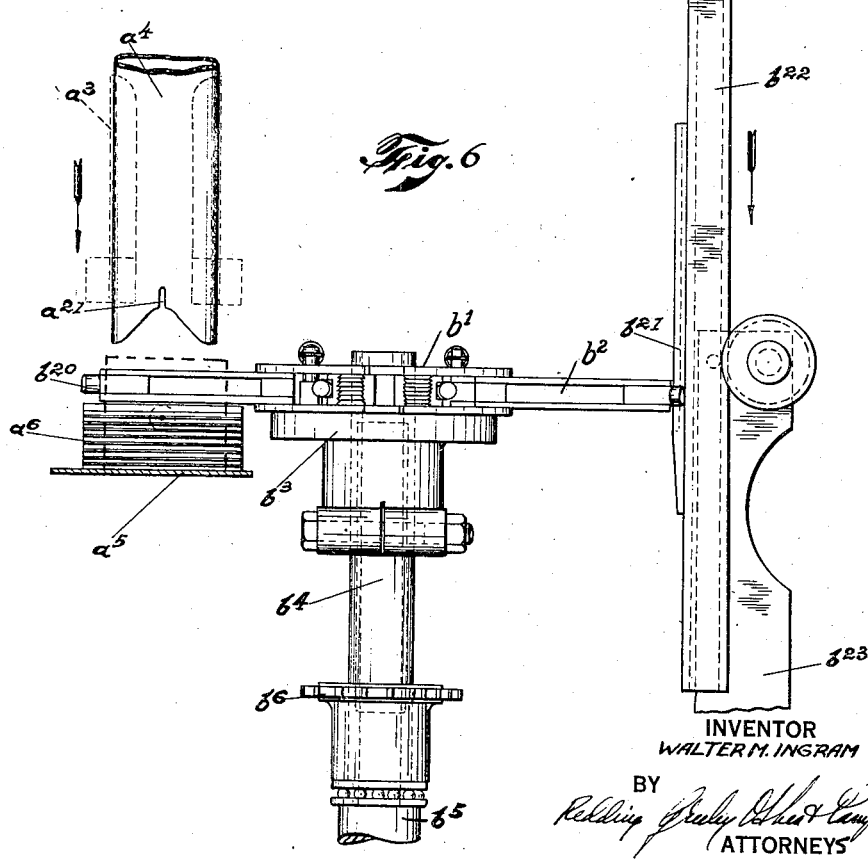

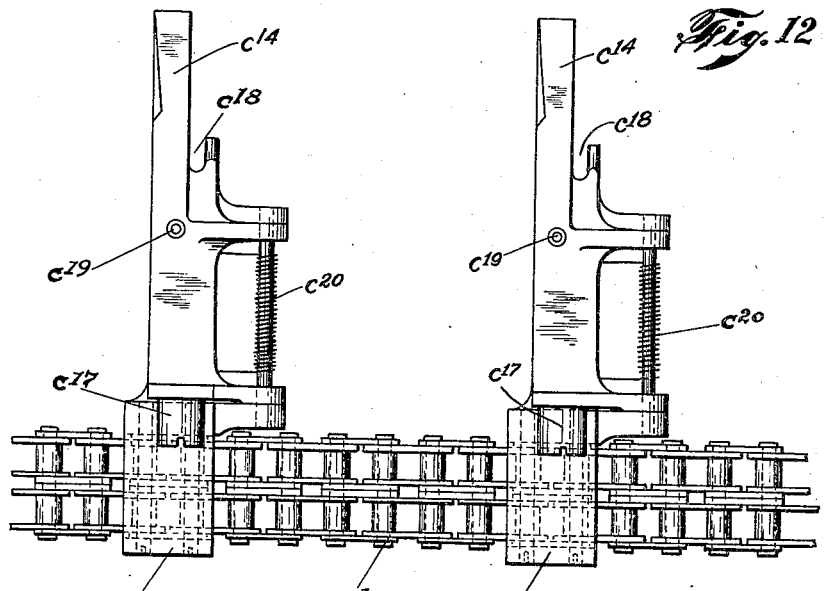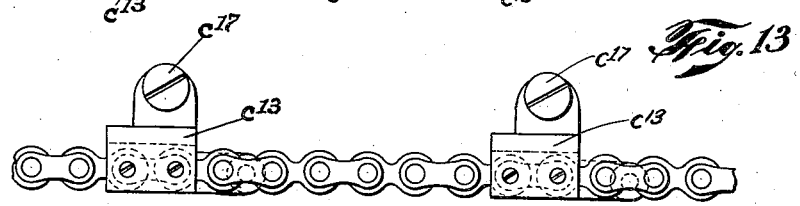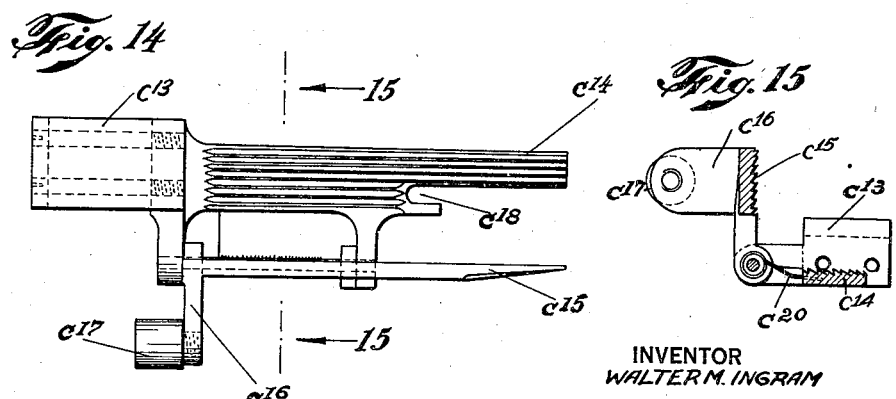

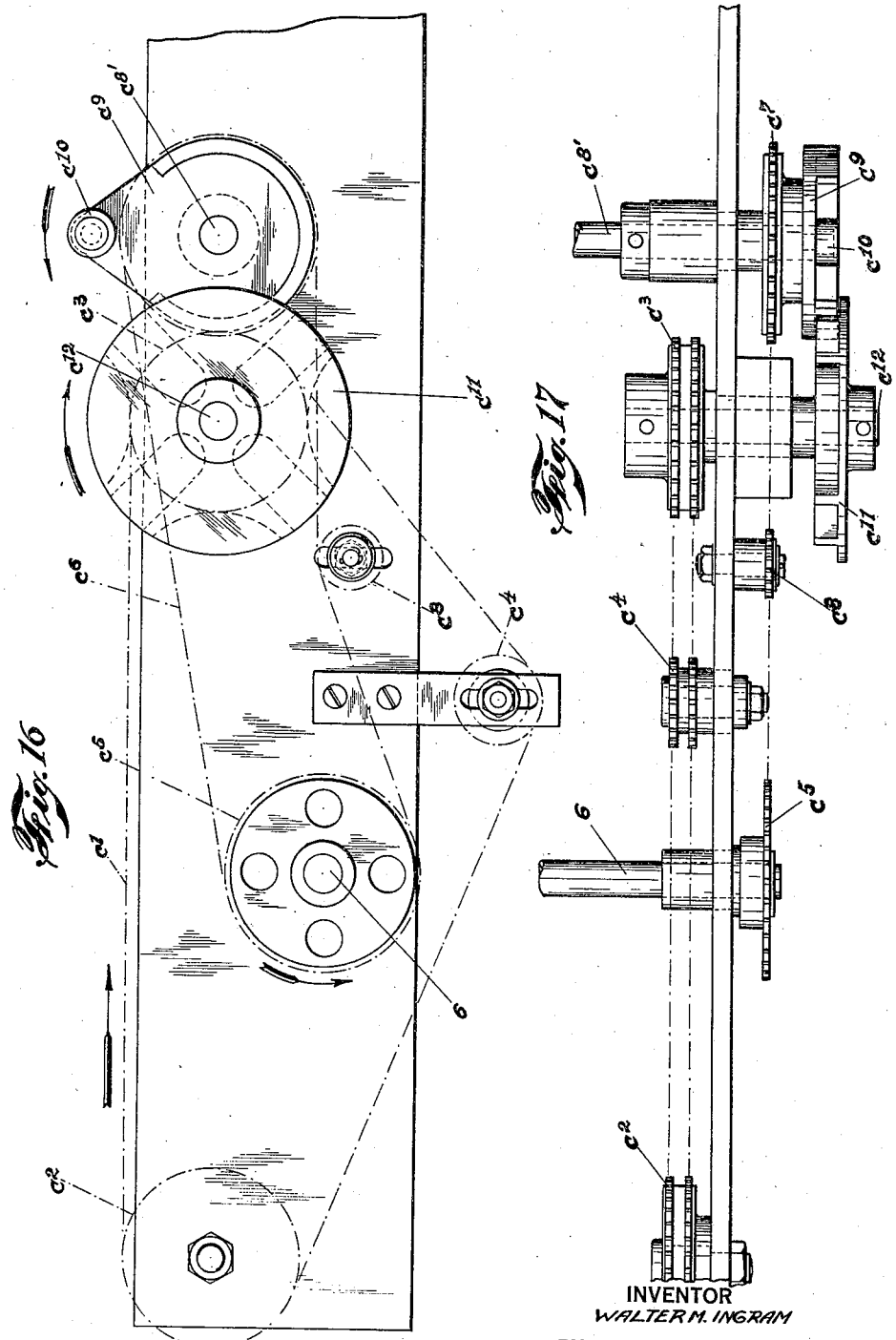

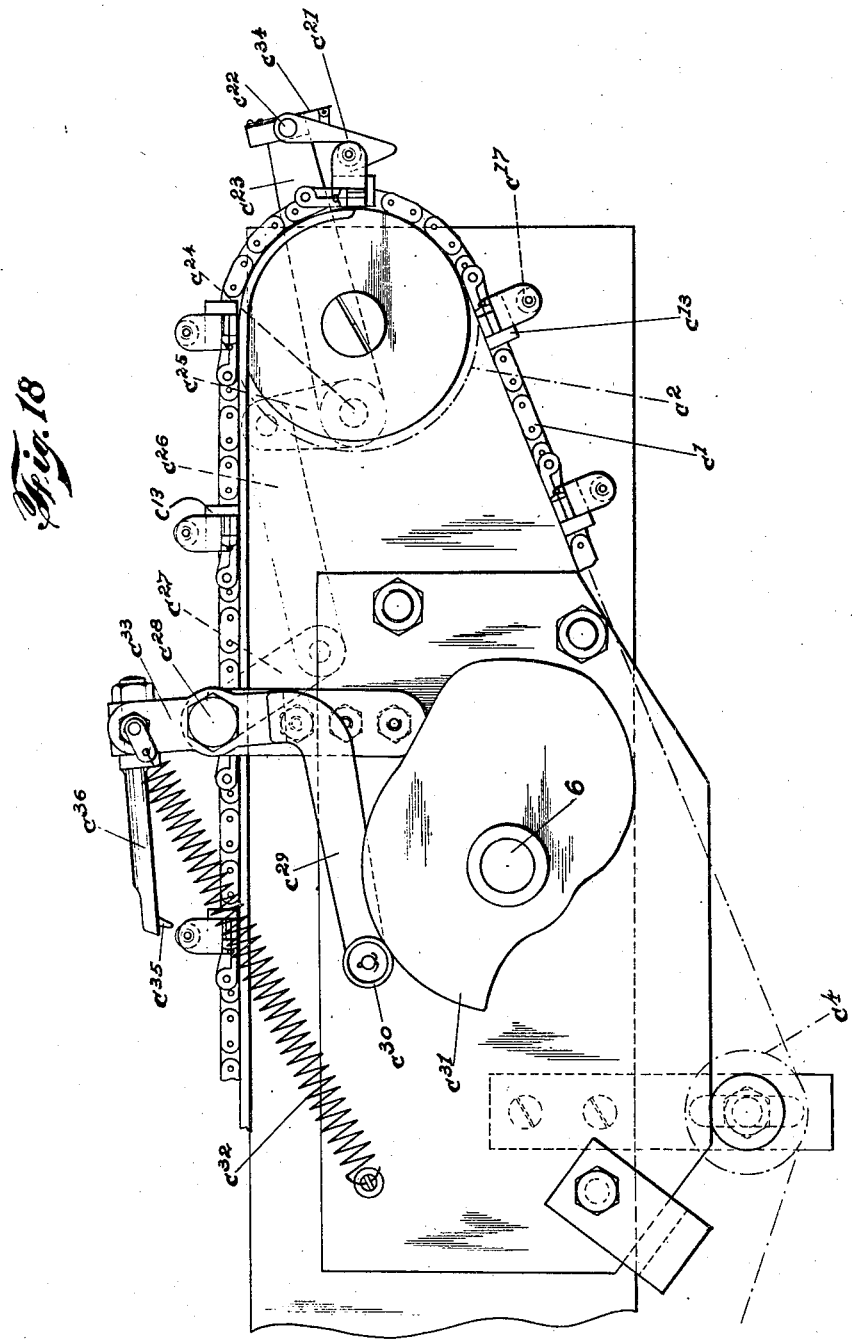

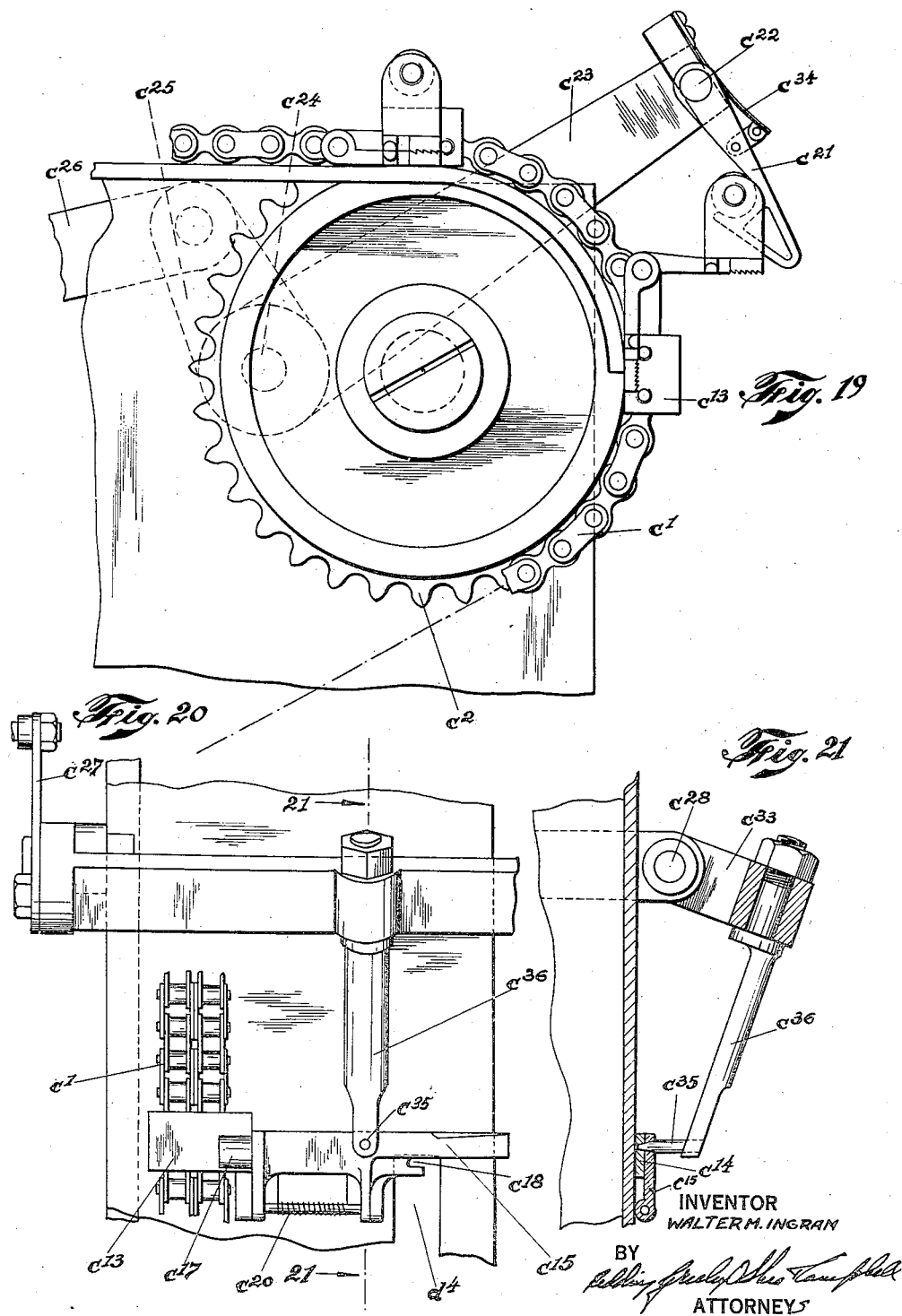

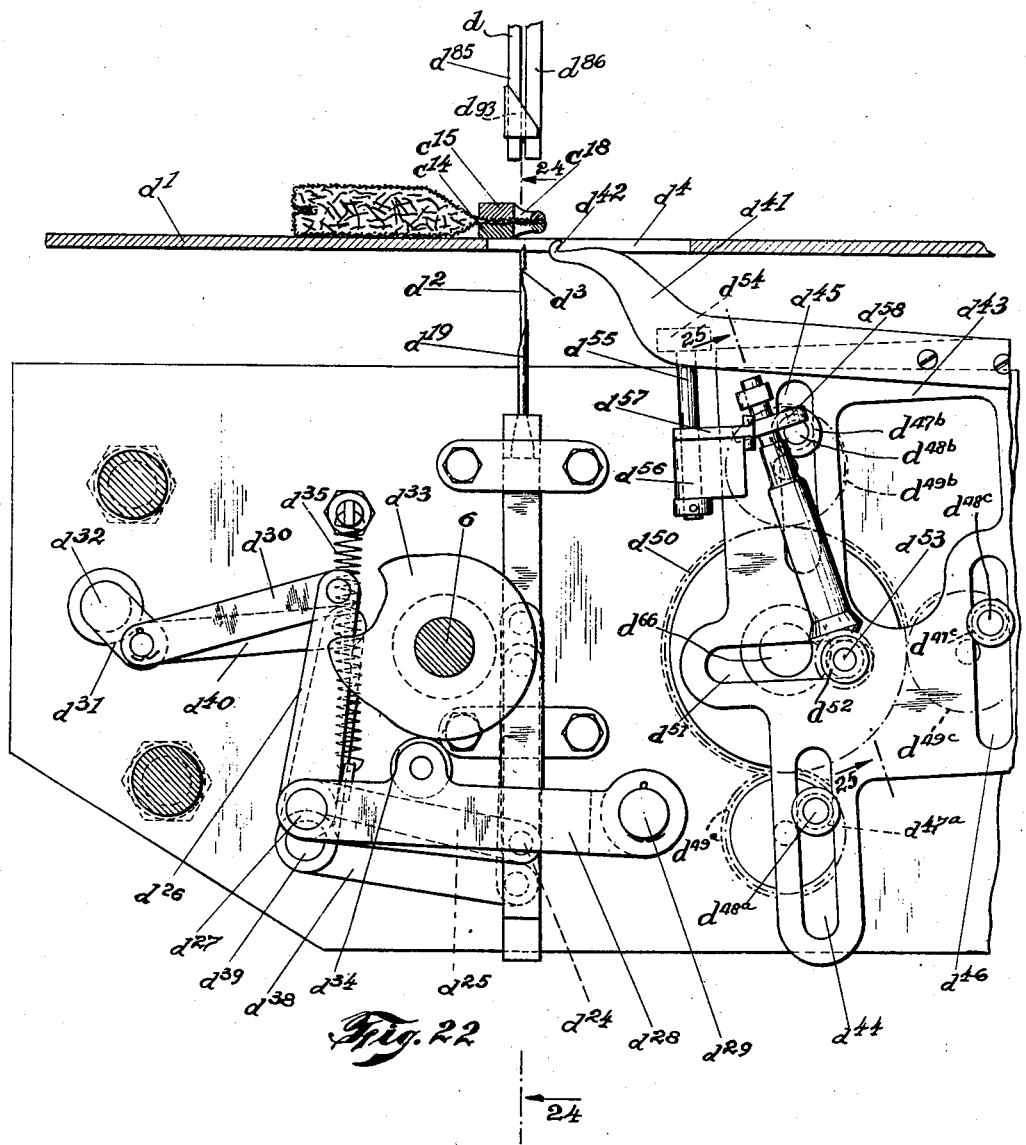

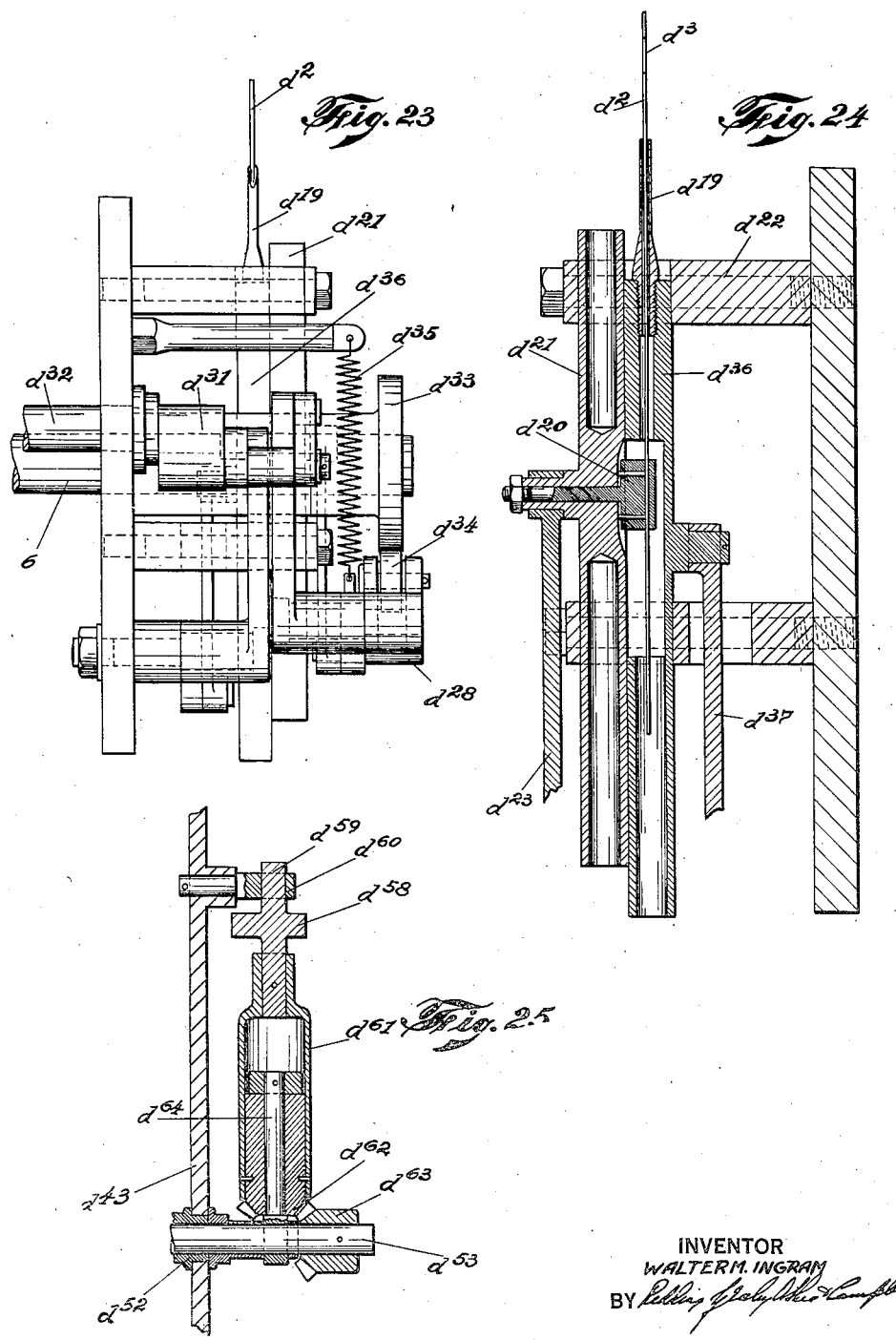

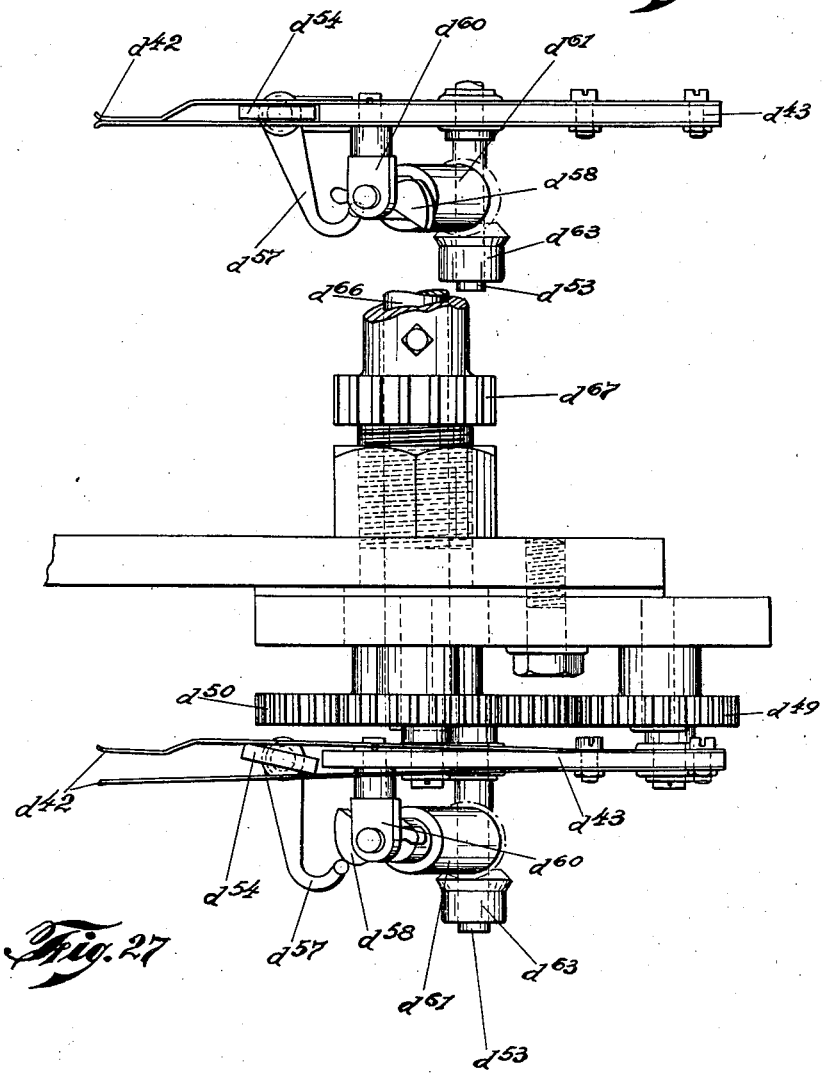

April 19, 1938.  W. M. INGRAM  2,114,304

SQUARE TEA BAG MACHINE

Filed Oct. 17, 1933   29 Sheets-Sheet 14

INVENTOR
WALTER M. INGRAM
BY
ATTORNEYS

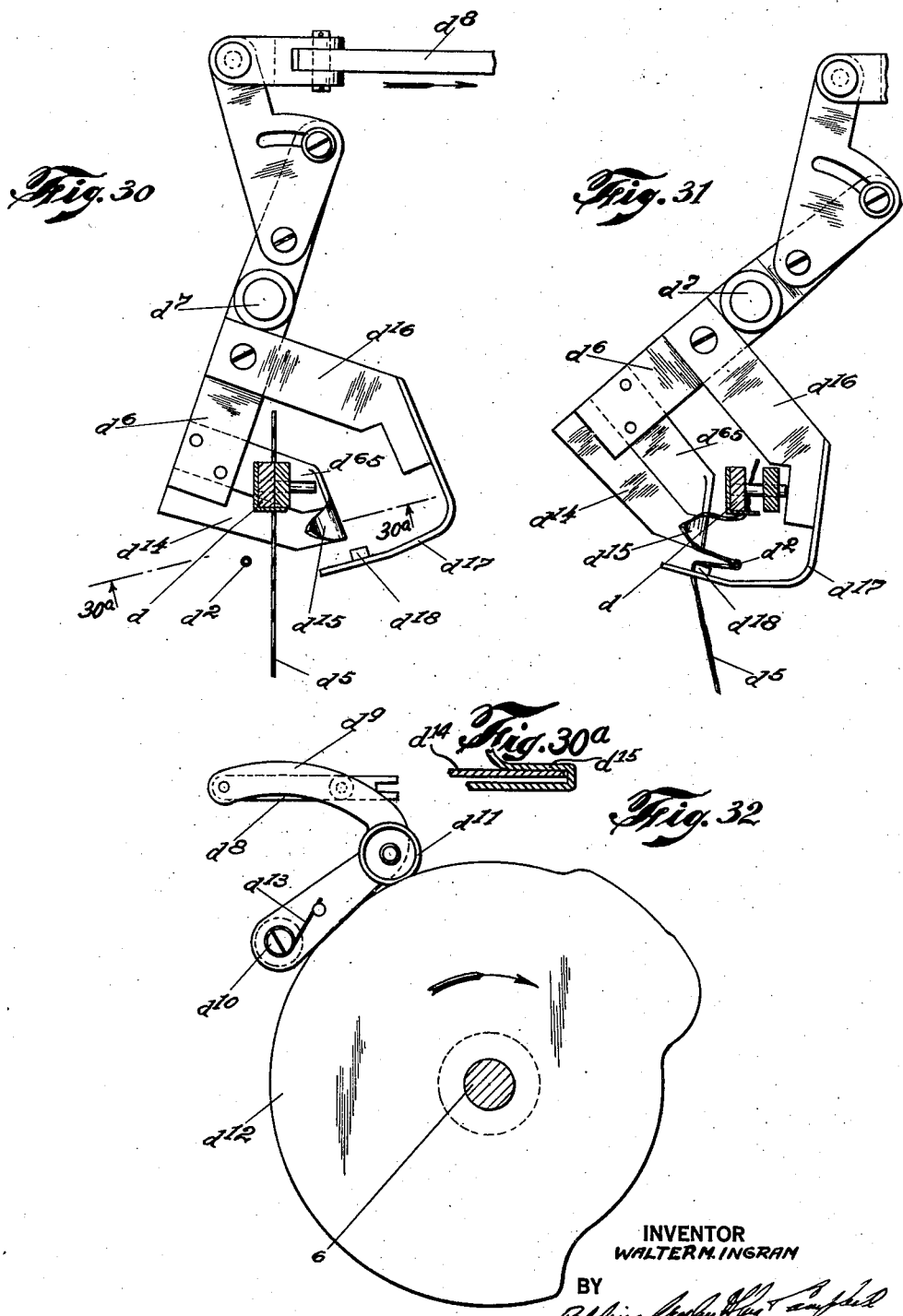

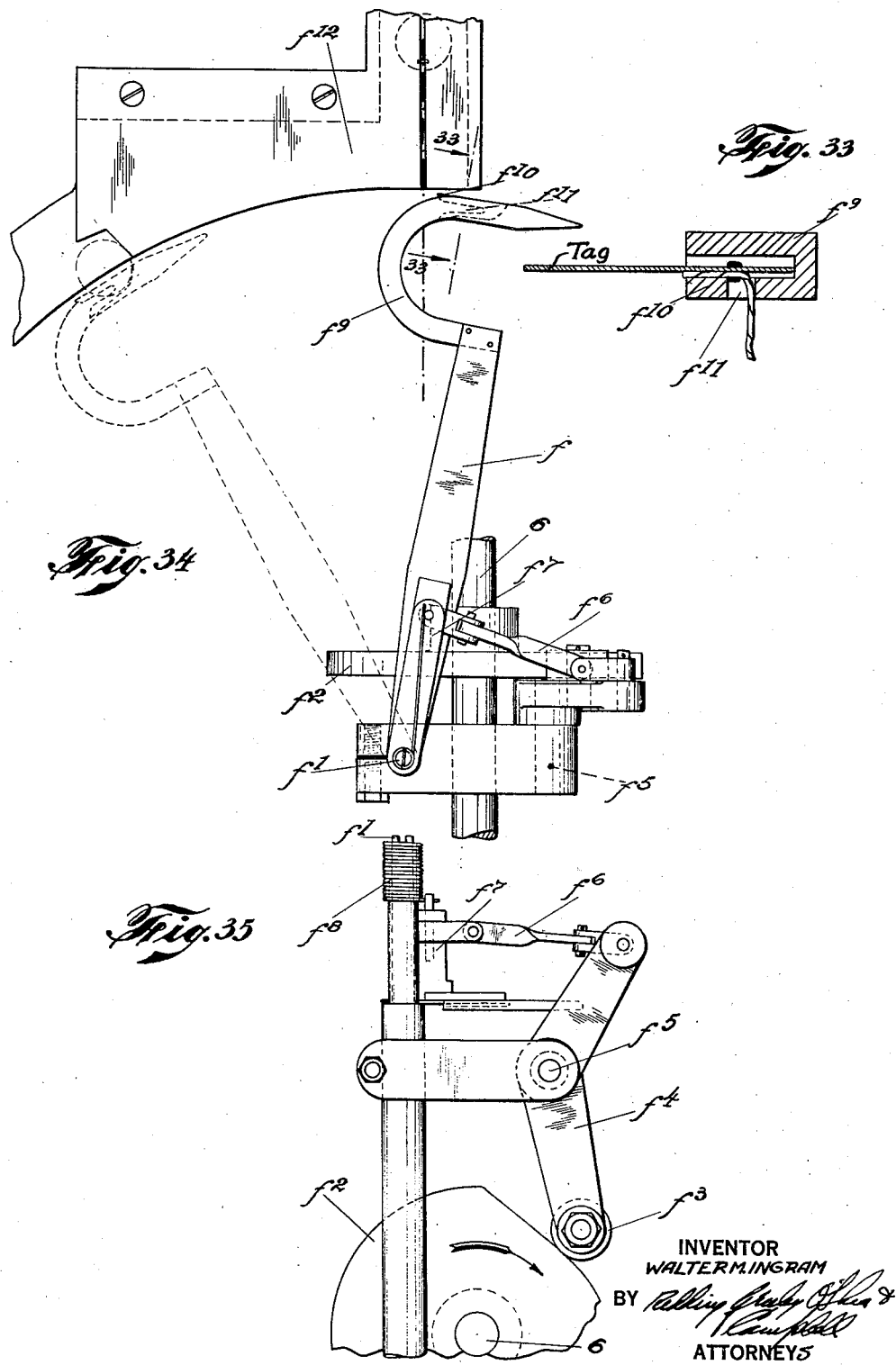

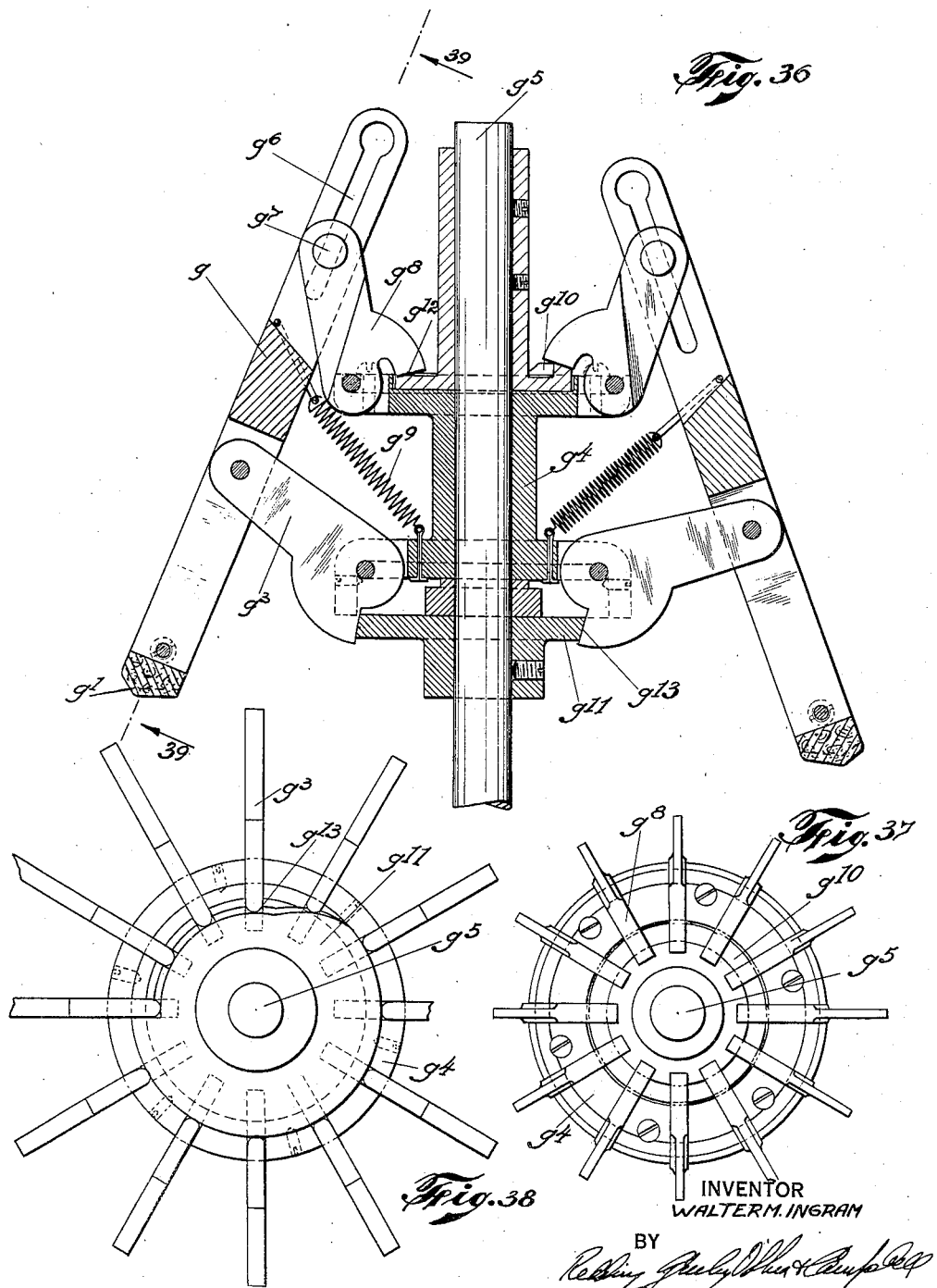

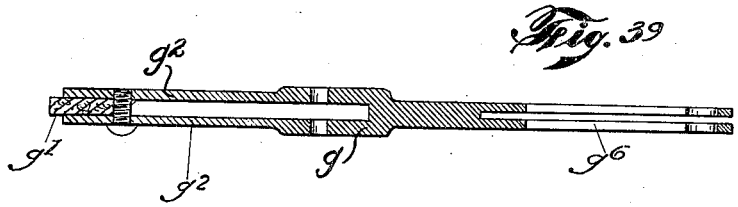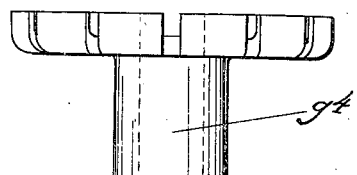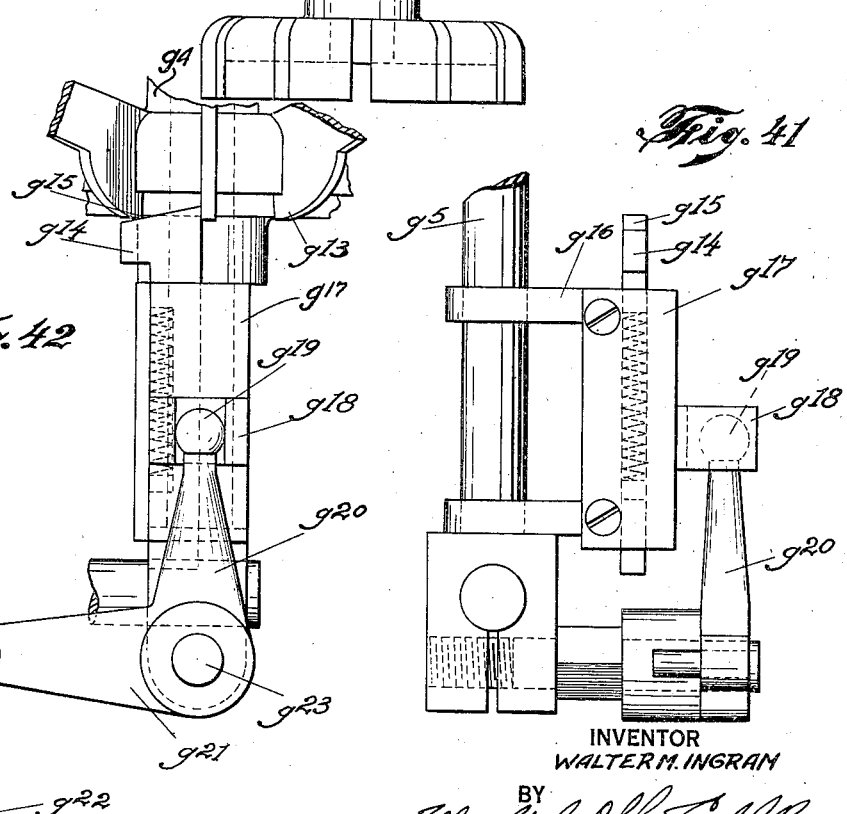

April 19, 1938.  W. M. INGRAM  2,114,304
SQUARE TEA BAG MACHINE
Filed Oct. 17, 1933   29 Sheets-Sheet 19

INVENTOR
WALTER M. INGRAM
BY
ATTORNEYS

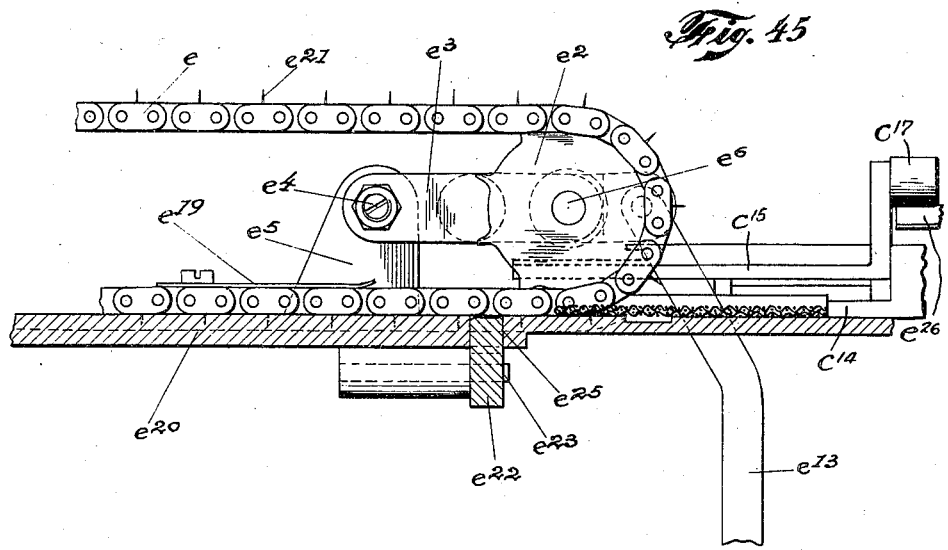
Fig. 45
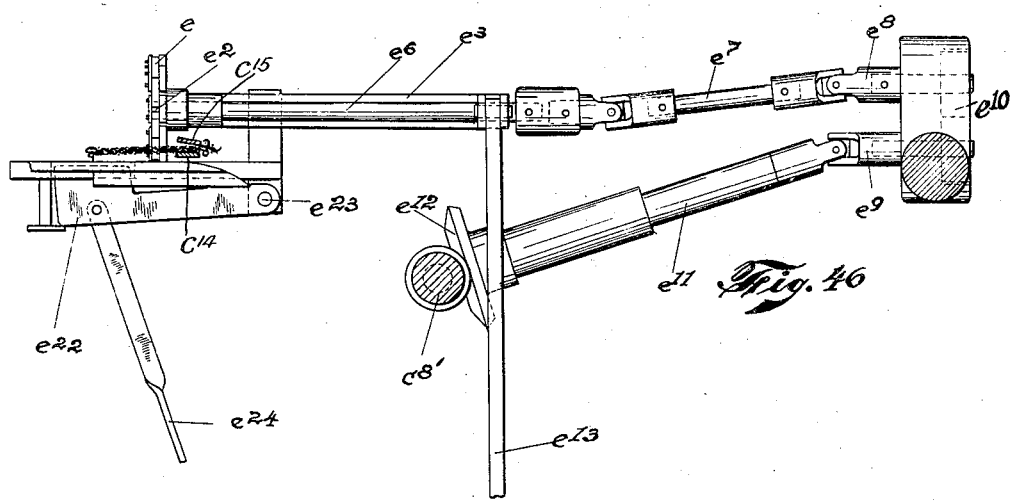
Fig. 46
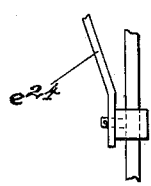
INVENTOR
WALTER M. INGRAM
BY
ATTORNEYS April 19, 1938.  W. M. INGRAM  2,114,304
SQUARE TEA BAG MACHINE
Filed Oct. 17, 1933  29 Sheets-Sheet 22

INVENTOR
WALTER M. INGRAM
BY
ATTORNEYS

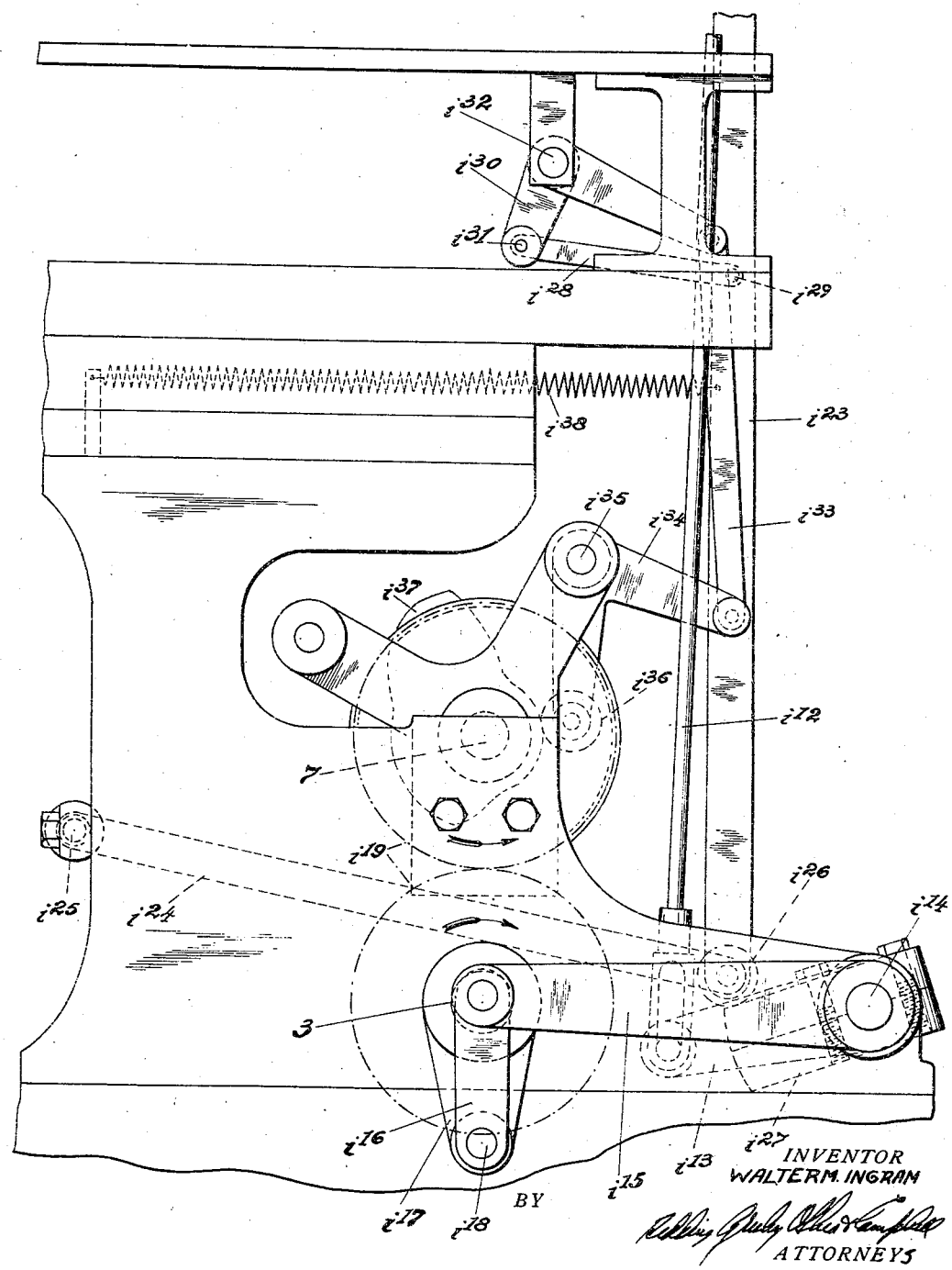

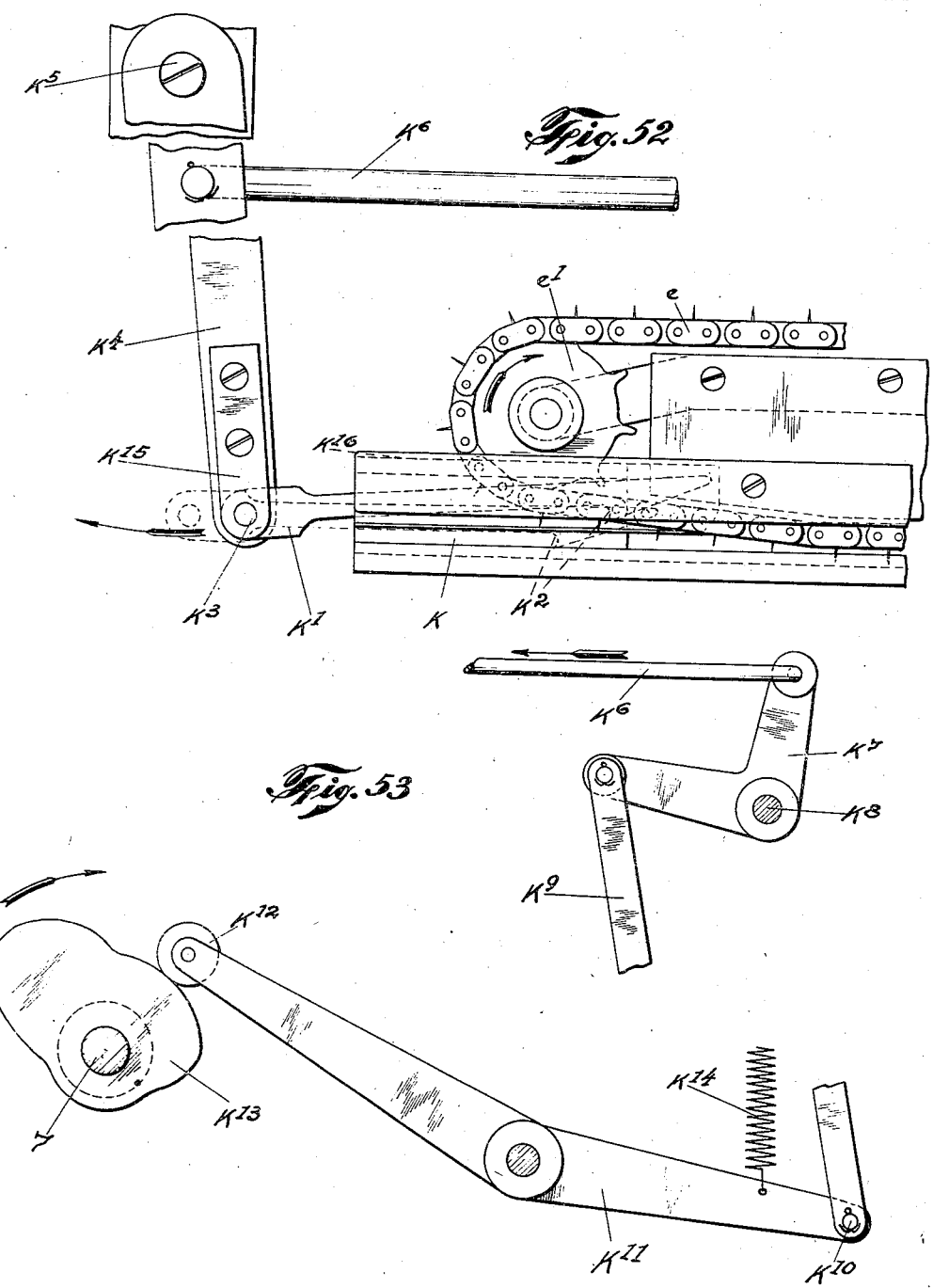

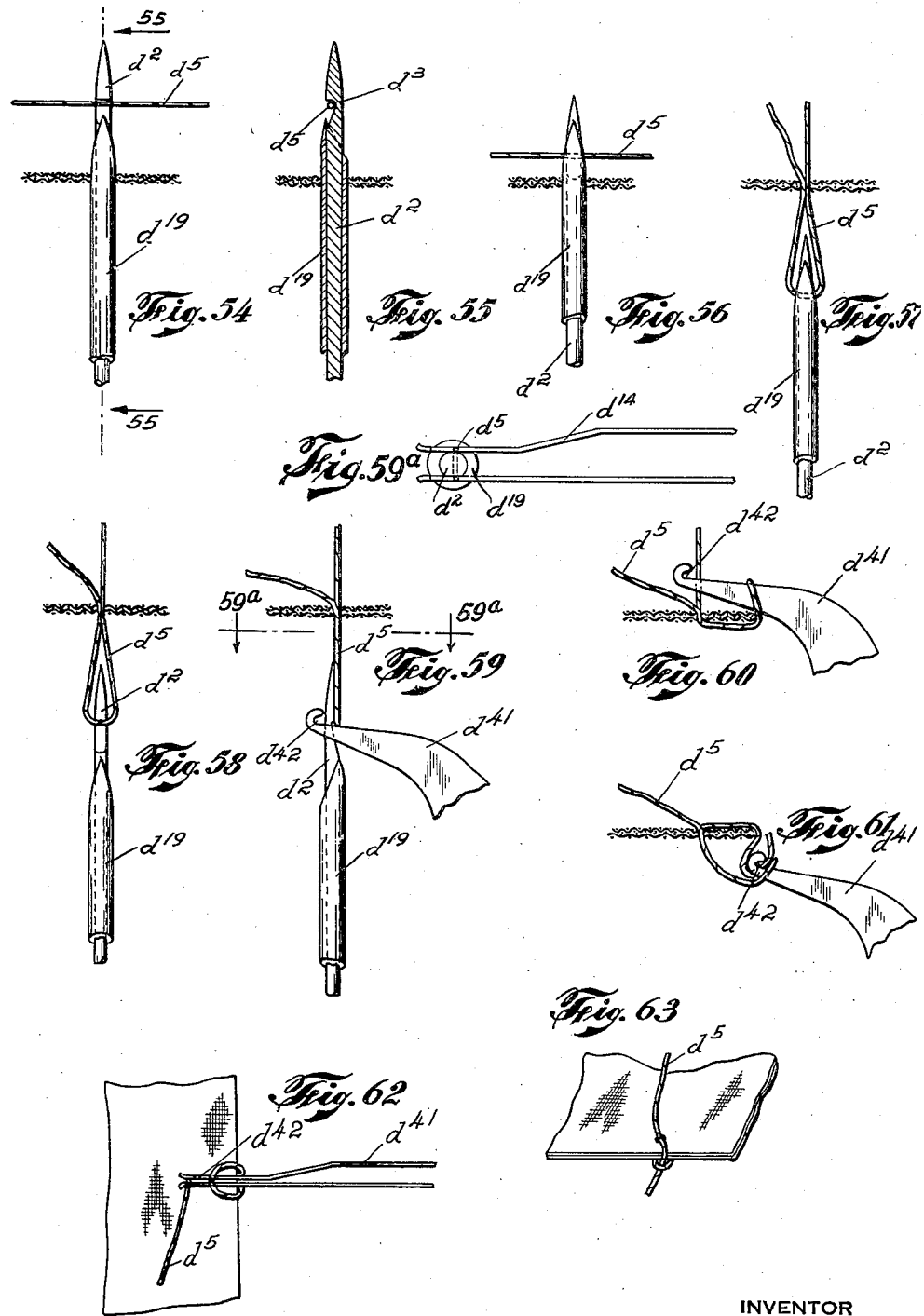

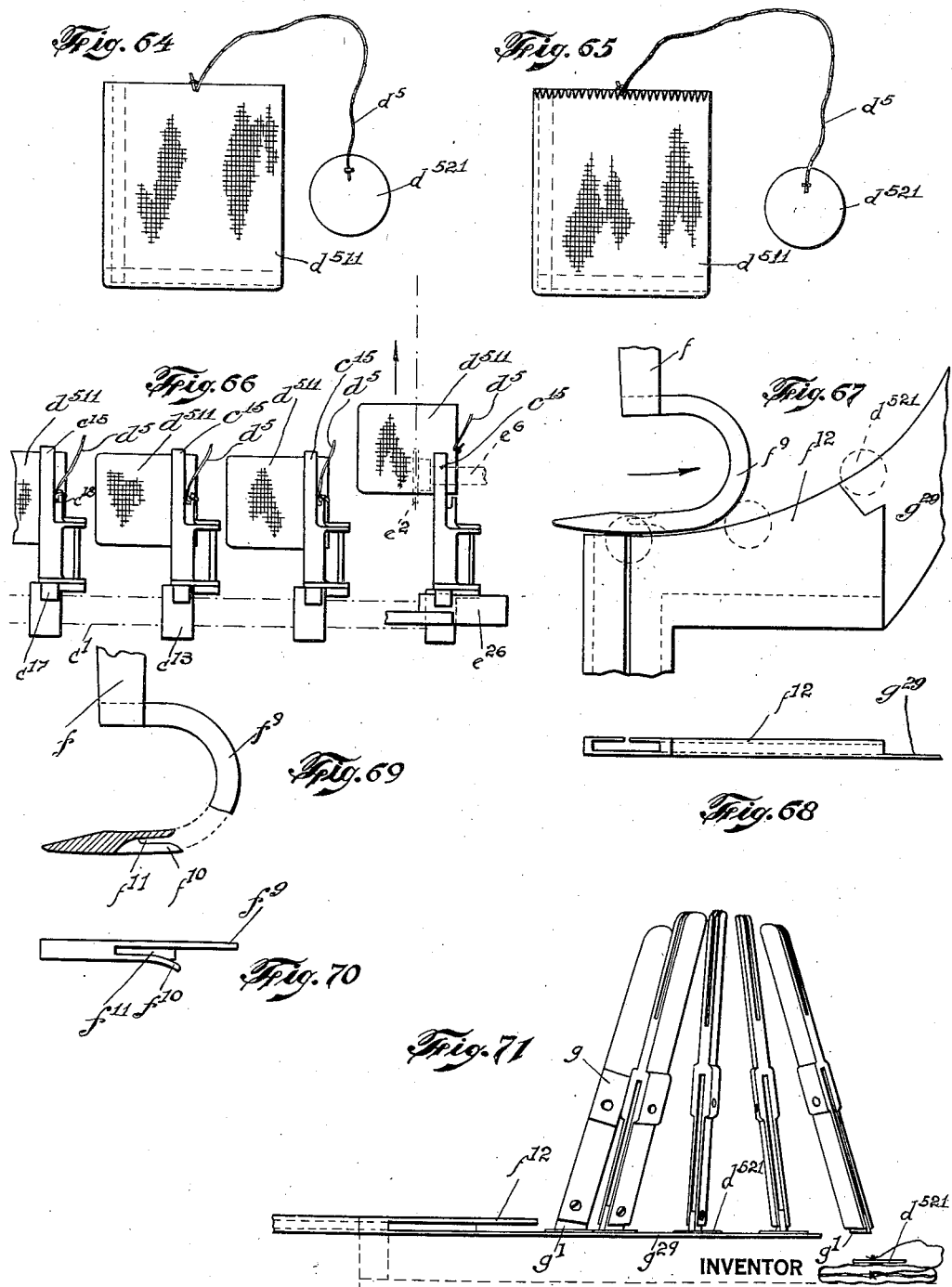

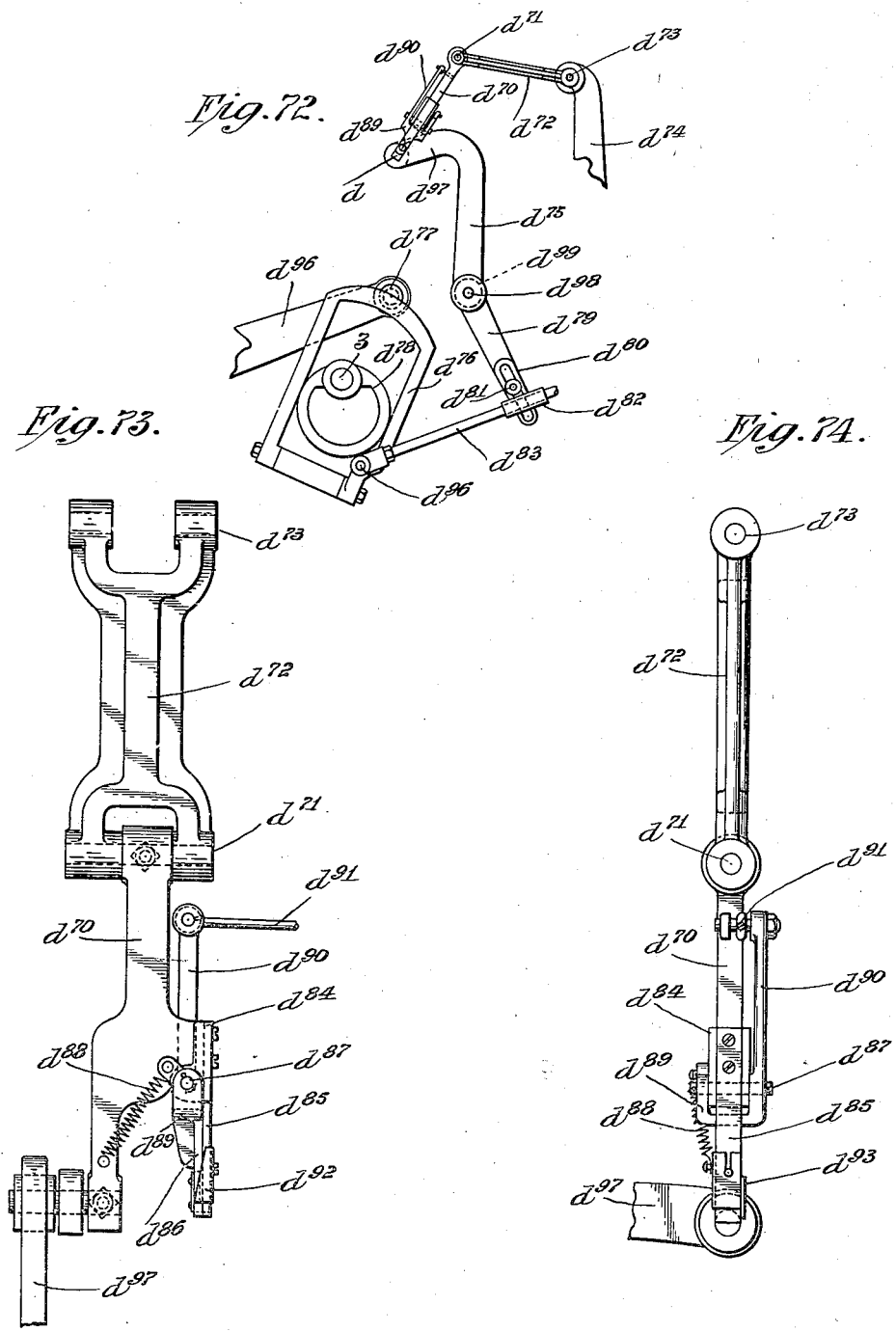

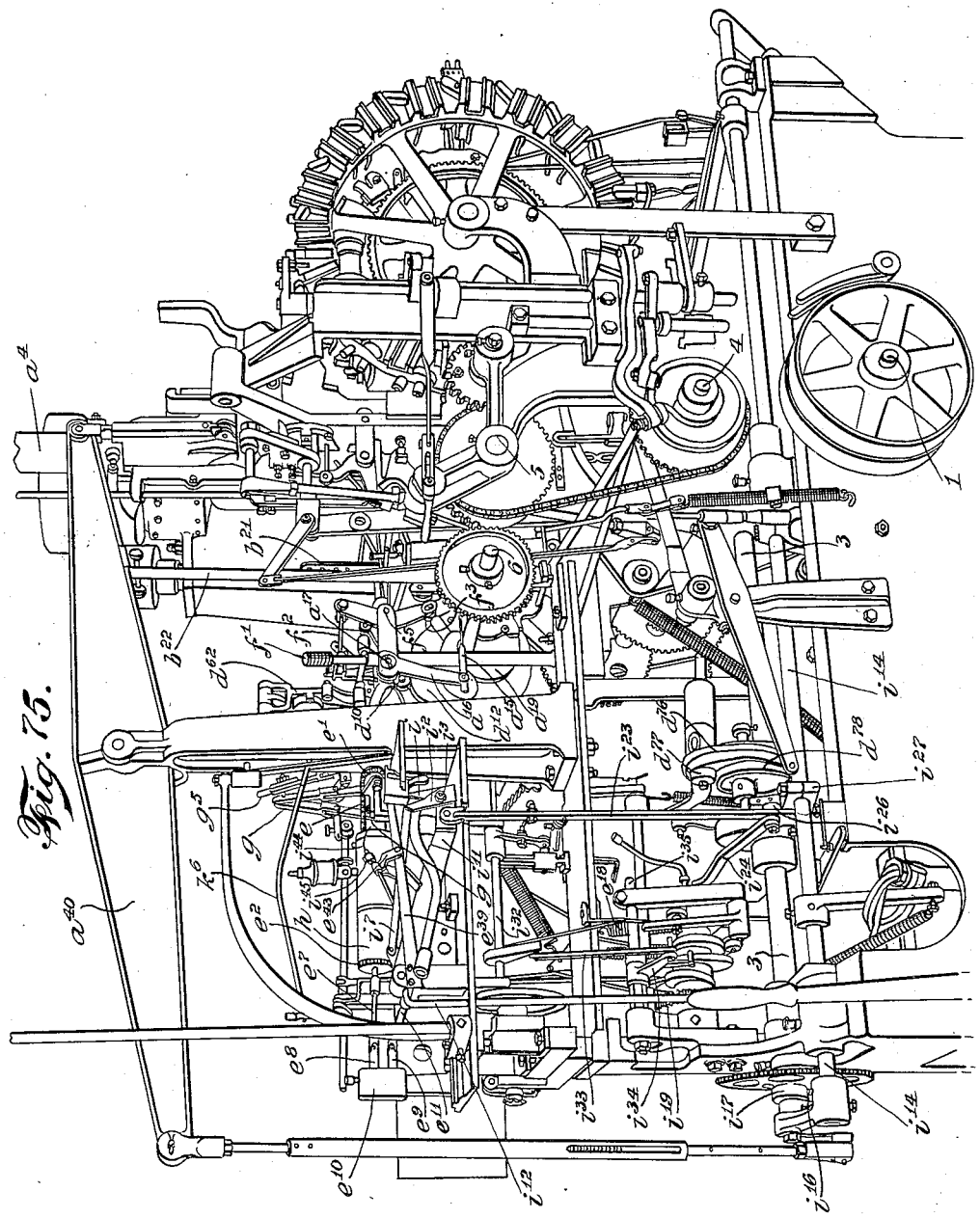

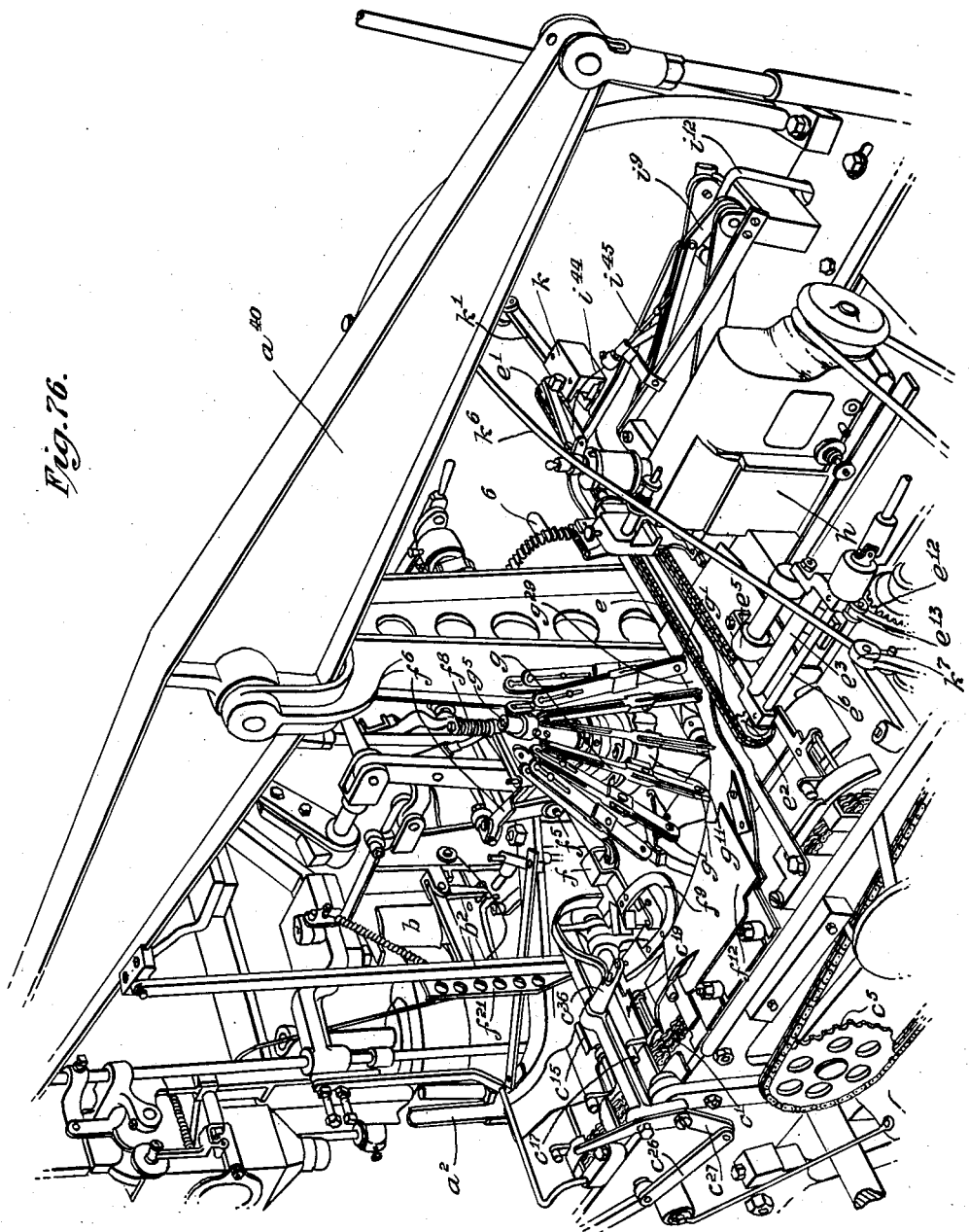

Patented Apr. 19, 1938

2,114,304

UNITED STATES PATENT OFFICE 2,114,304

SQUARE TEA BAG MACHINE

Walter M. Ingram, New York, N. Y., assignor to Millie Patent Holding Co., Inc., New York, N. Y., a corporation of New York Application October 17, 1933, Serial No. 693,948

29 Claims. (Cl. 112—2)

The present invention relates to bag forming machines and embodies, more specifically, a tea bag machine construction of the type adapted to fill and close bags for tea and like substances wherein a tag bearing string is secured to each bag.

More particularly, the invention comprises a machine by means of which tea bags may be closed by a sewing operation, such operation additionally serving to anchor a tag bearing string to the bag.

Machines are now available by means of which bags may be formed, filled and closed, as well as having tag bearing strings secured to the respective bags. Such mechanisms have included mechanism for engaging the necks of the bags with clamps, loops of string, and other closing means. The present invention has for an object the provision of a machine for closing previously filled bags in a new and improved fashion. In particular, the manner in which the present invention proposes to close such bags is by sewing across the open ends thereof.

A further object of the invention is to provide an improved bag closing mechanism by means of which a tag bearing string is secured to the bag during an operation which complements the operation of a closing mechanism.

A further object of the invention is to provide a bag closing mechanism by means of which a tag bearing string is secured to a previously filled bag and anchored under a bag closing means which the mechanism applies to the previously filled bag.

A further object of the invention is to provide a bag closing mechanism for tying a tag bearing string to a previously filled bag and subsequently applying a bag closing means to the bag in such fashion as to anchor the previously tied string effectively to the bag.

A further object of the invention is to provide a bag closing mechanism by means of which the open ends of previously filled bags may be closed by overlocked stitching, which stitching is applied to the bag subsequent to the securing of a tag bearing string to the bag in order that the stitching may serve not only as a bag closing means but also as a means for anchoring the tag bearing string to the bag.

A further object of the invention is to provide a bag closing mechanism wherein tag bearing strings are secured to successive bags and means is provided for closing the bags subsequently, the mechanism being of such character as to insure, positively, the effective and accurate functioning of the elements of the mechanism in order that the continuous operation of the mechanism may not be impaired.

Further objects, not specifically enumerated above, will be apparent as the invention is described in greater detail in connection with the accompanying drawings, wherein:

Figure 1 is a plan view showing a machine constructed in accordance with the present invention with certain of the elements removed in order that the various stations of the machine at which operations are performed upon bags may be seen more clearly.

Figure 2 is a view in front elevation showing the machine of Figure 1, without showing the details of the operating mechanisms for the various bag handling elements.

Figure 3 is a detail view showing the power supplying elements of the machine of Figures 1 and 2.

Figure 4 is a detail view showing the device by means of which the cooperating arms of the transfer table are separated.

Figure 5 is a detail plan view showing the transfer mechanism with the arms thereof separated by the device shown in Figure 4.

Figure 6 is a detail view in side elevation showing the manner in which filled bags are supplied to the transfer mechanism shown in Figure 5.

Figure 7 is an enlarged view in section, taken on line 7—7 of Figure 5, and looking in the direction of the arrows.

Figure 8 is an enlarged view in section, taken on line 8—8 of Figure 5, and looking in the direction of the arrows.

Figure 9 is an enlarged view in section, taken on line 9—9 of Figure 5, and looking in the direction of the arrows.

Figure 10 is a detail plan view showing the mechanism by means of which filled bags are prevented from being lifted with the filler spout shown in Figure 6.

Figure 11 is a detail plan view of the mechanism by means of which the bag holding mechanism of Figure 10 is operated.

Figure 12 is a detail enlarged view showing a portion of the chain conveyor for engaging and moving previously filled bags through the string tying mechanism.

Figure 13 is a view in side elevation, showing the elements of Figure 12.

Figure 14 is a plan view showing the bag engaging jaws of the chain conveyor of Figure 12 moved into an open position.

Figure 15 is a view in section, taken on line

15—15 of Figure 14, and looking in the direction of the arrows.

Figure 16 is a partial view in side elevation of the mechanism by means of which the chain conveyor is driven intermittently.

Figure 17 is a plan view of the elements shown in Figure 16.

Figure 18 is a view in side elevation looking from the opposite direction through Figure 16, and showing the mechanism by means of which the pivoted dog is operated for separating the bag engaging jaws of the chain.

Figure 19 is an enlarged partial view showing the jaws moved to their open position.

Figure 20 is a plan view showing the conveyor chain locking mechanism which insures the accurate positioning of the chain during the time the chain is stationary.

Figure 21 is a view in section, taken on line 21—21 of Figure 20, and looking in the direction of the arrows.

Figure 22 is a detail view in side elevation showing the needle and quill actuating mechanism by means of which tag bearing strings are looped and tied to the bags.

Figure 23 is a view in end elevation looking from the left, as viewed in Figure 22, and showing the needle and quill actuating mechanism.

Figure 24 is a view in section, taken on line 24—24 of Figure 22, and looking in the direction of the arrows. In this view the bag rail and bag engaging means have been omitted and the needle and quill shown in their lowermost positions.

Figure 25 is a view in section, taken on line 25—25 of Figure 22, and looking in the direction of the arrows, this view showing the details of the means for operating the tying fingers.

Figure 26 is a detail plan view of the tying fingers shown in Figure 22.

Figure 27 is a detail view similar to Figure 26 but showing the fingers moved to an open position and the mechanism for effecting such operation.

Figure 28:
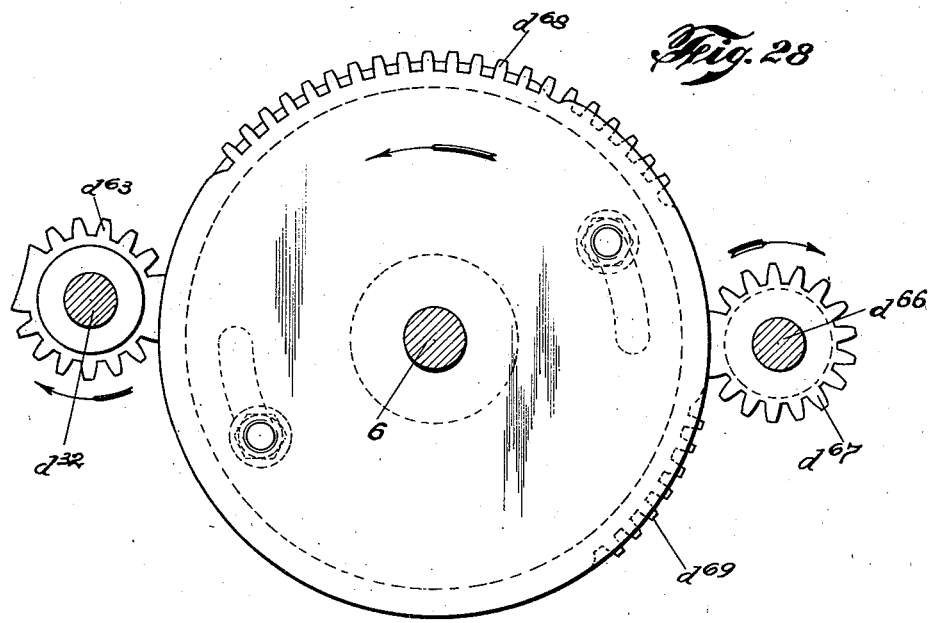

Figure 28 is a detail enlarged view showing the power supplying means for the shafts for operating the needle, quill and looping fingers previously referred to.

Figure 29:
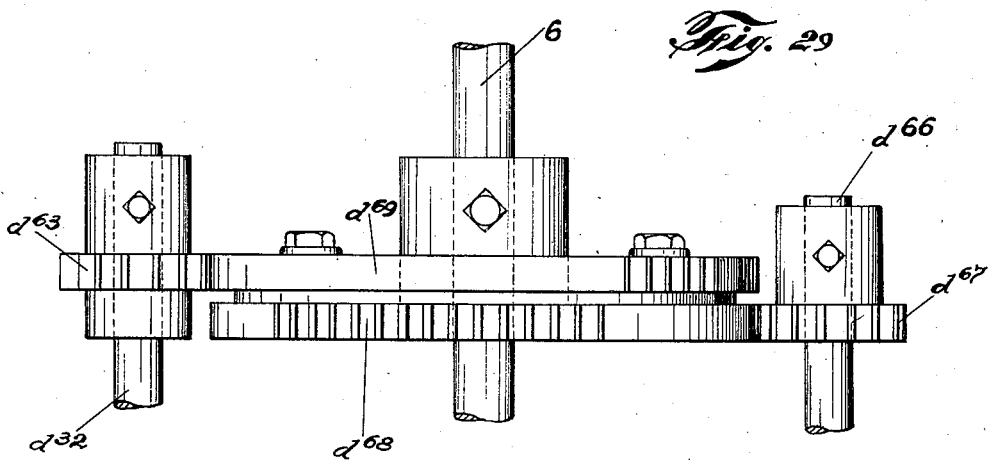

Figure 29 is a plan view of the elements shown in Figure 28.

Figure 30 is a plan view showing the string tensioning mechanism for moving the string against the needle after it has been inserted through the bag.

Figure 30a is a detail section on the line 30a—30a of Figure 30.

Figure 31 is a view similar to Figure 30, showing the elements moved into such position that the string is bent around the needle.

Figure 32 shows the operating mechanism for the elements shown in Figures 30 and 31.

Figure 33 is an enlarged view in section, taken on line 33—33 of Figure 34, and looking in the direction of the arrows, this view showing the manner in which a tag is positioned in the tag transferring arm.

Figure 34 is a detail plan view showing the tag transfer arm and operating mechanism therefor.

Figure 35 is a view in end elevation showing the transfer arm operating mechanism in Figure 34.

Figure 36 is a view in section, taken through the axis of a friction tag transfer head construction in accordance with the present invention.

Figure 37 is a plan view in reduced scale showing the arms and head construction of Figure 36.

Figure 38 is a view similar to Figure 37 on a larger scale showing the friction tag driving arms moved into different positions from those shown in Figures 36 and 37.

Figure 39 is a detail view in section, taken on line 39—39 of Figure 36, and looking in the direction of the arrows.

Figure 40 is a detail plan view in side elevation, showing the arm mounting head of Figure 36.

Figure 41 is a detail view in side elevation showing the actuating means for the friction tag driving means.

Figure 42 is a view in front elevation showing the manner in which the elements of Figure 41 engage and drive the arm bearing head.

Figure 43:
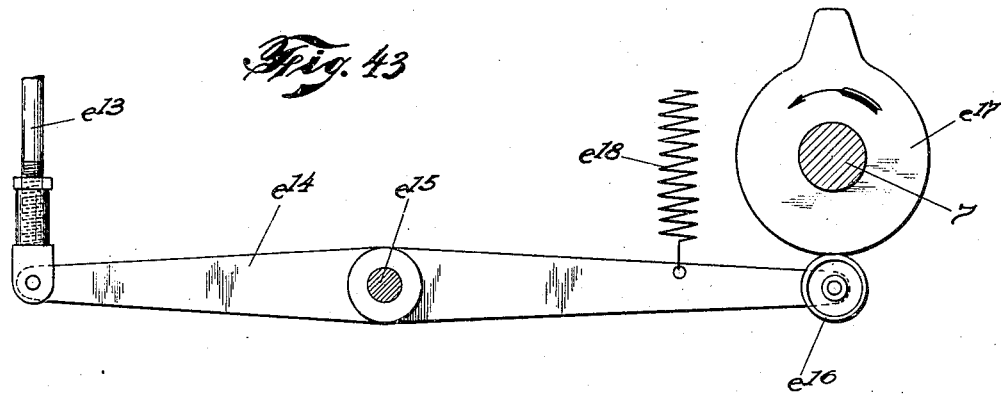

Figure 43 is a view in front elevation showing the means for operating the lifting mechanism on one end of the secondary bag conveyor chain.

Figure 44:
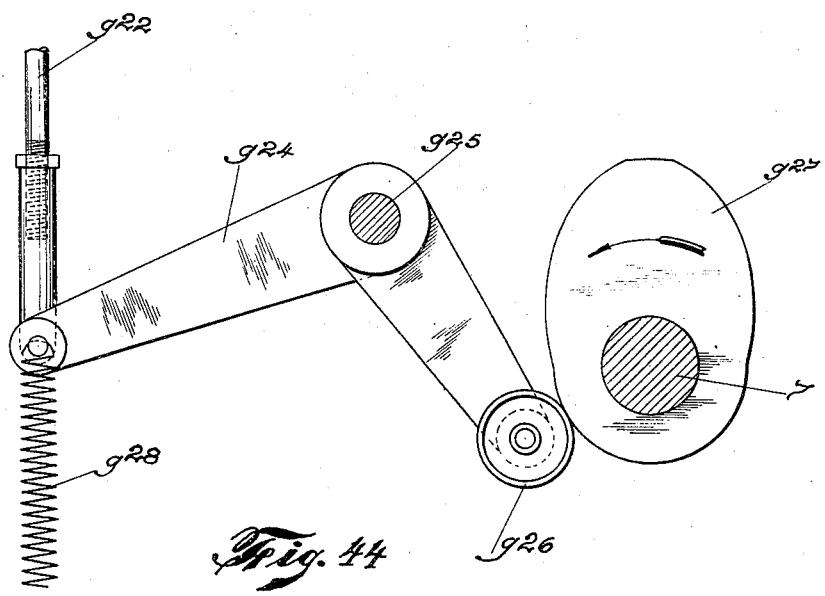

Figure 44 is a view in front elevation showing the means for operating the friction tag moving head actuating mechanism shown in Figures 41 and 42.

Figure 45 is an enlarged detail view in section, taken on line 45—45 of Figure 1, and looking in the direction of the arrows.

Figure 46 is an enlarged detail view in section, taken on line 46—46 of Figure 1, and looking in the direction of the arrows.

Figure 47:
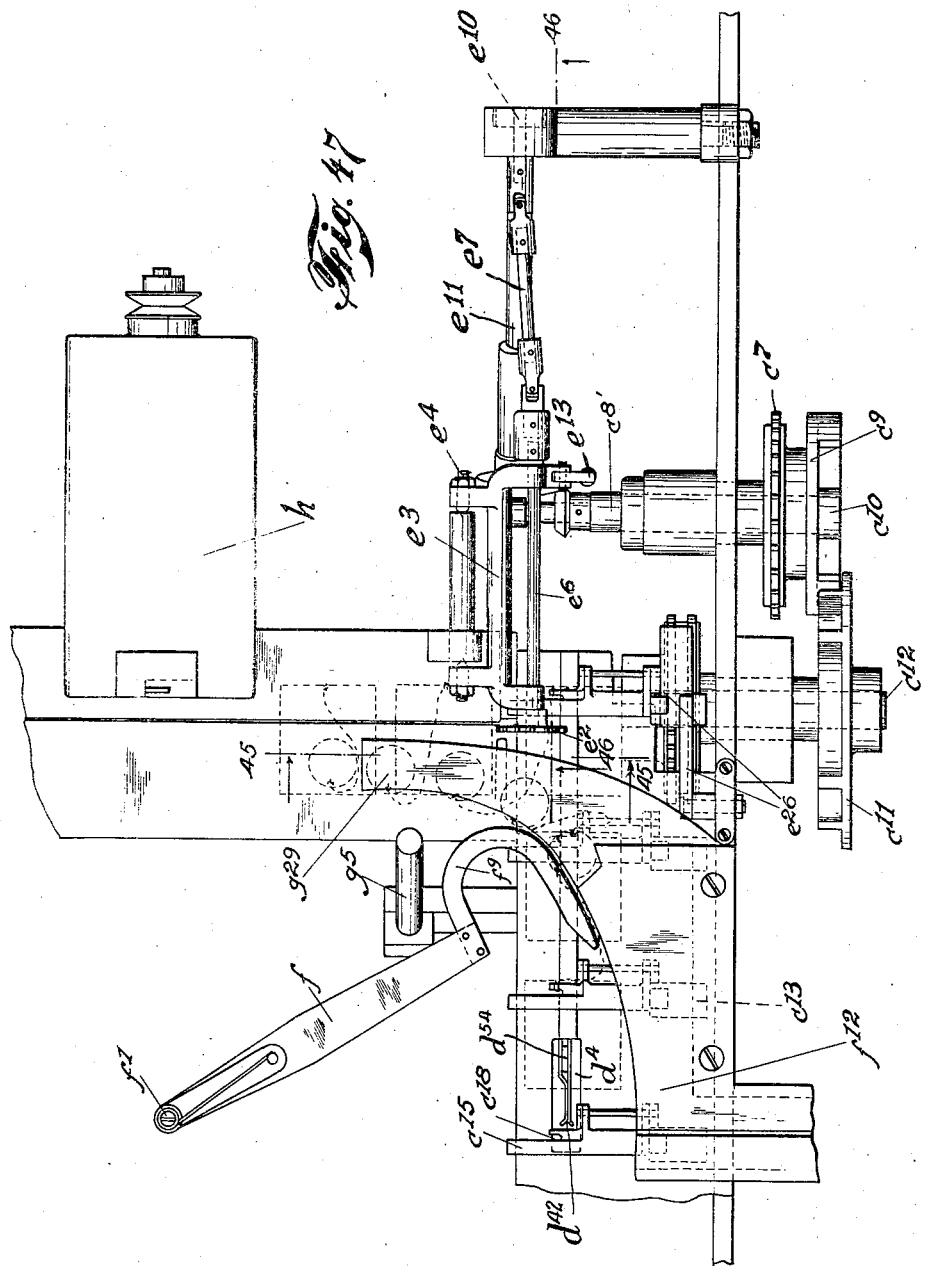

Figure 47 is a partial plan view, similar to Figure 1 and slightly enlarged, showing the tag moving mechanism.

Figure 48:
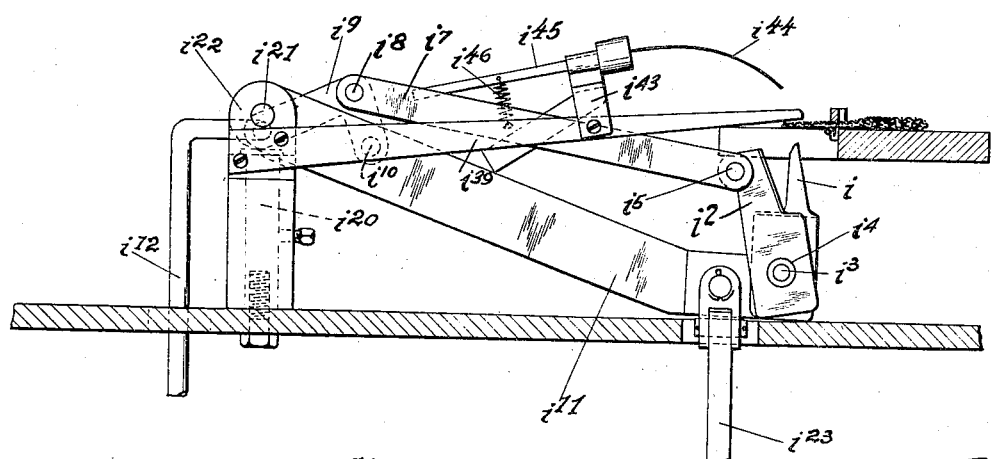

Figure 48 is a detail view in side elevation showing the cutting mechanism for cutting the string between successively sewed bags.

Figure 49:
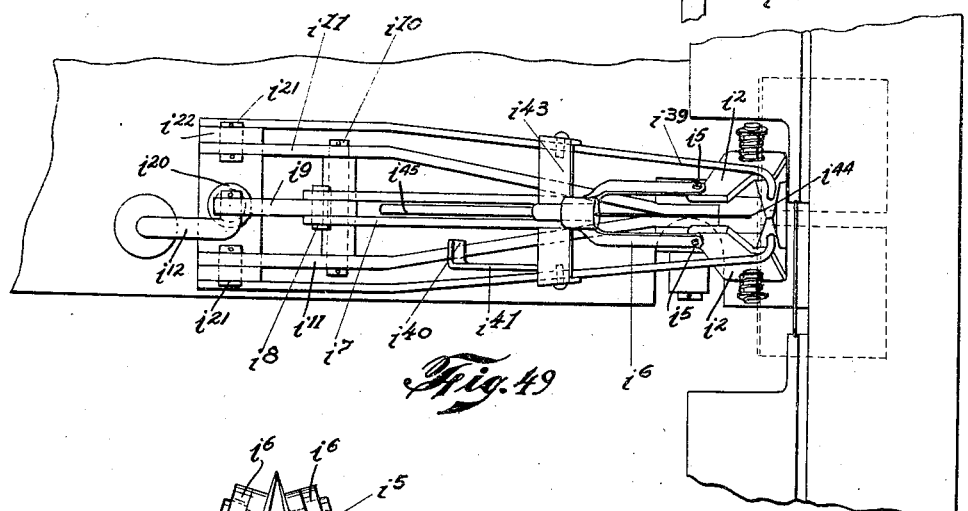

Figure 49 is a plan view of the mechanism shown in Figure 48.

Figure 50:
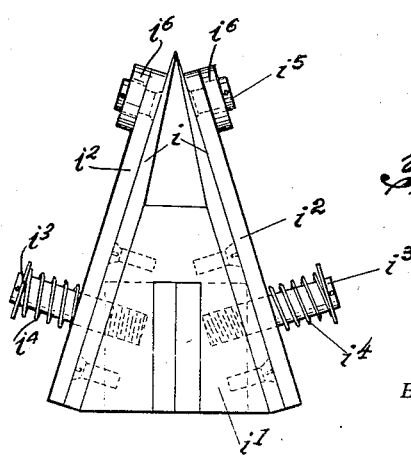

Figure 50 is an enlarged end view of the cutting members shown in Figures 48 and 49.

Figure 51 is a view in side elevation, showing the mechanism for actuating the cutting mechanism and simultaneously moving the cutting mechanism with the bags.

Figure 52 is a view in side elevation showing the mechanism by means of which bags are removed from the secondary chain conveyor and discharged from the machine.

Figure 53 is a view in side elevation showing the operating mechanism for the elements of Figure 52.

Figures 54–61 are detail views showing the relative positions of the quill, needle and spring fingers at each successive step of the knot tying operation.

Figure 59a is a detail plan view looking down from the plane indicated by the line 59a—59a of Figure 59.

Figure 62 is a detail view of the knot as partly formed in the positions shown in Figure 60.

Figure 63 is a detail view showing the knot in final form.

Figure 64 is a view of a bag with the string and tag attached, but before the bag is stitched across the top.

Figure 65 is a view similar to Figure 64, but showing the bag stitched across the top.

Figure 66 is a diagrammatic view showing successive positions of the bags with the primary carrier chain, the bag at the right hand of the figure being shown as partly discharged from its clamping jaws.

Figure 67 is a detail plan view showing the device for transferring the tag of each bag, after it has been connected to the bag, to the friction tag moving means, successive positions of the bags being indicated by broken lines.

Figure 68 is an edge view of the table and guide rail shown in Figure 67, as seen from below in Figure 67.

Figures 69 and 70 are detail views of the tag transferring device shown in Figure 67.

Figure 71 is a partial view in elevation showing the operative relation of the friction tag moving device, shown in detail in Figures 36, 37 and 38, to the table and guide rail, this figure showing at the lower right hand portion thereof a bag with string and tag attached in the position in which it is deposited by the tag moving device upon the secondary carrier by which it is presented to the sewing mechanism.

Figure 72 is a detail view in elevation of the mechanism employed in actuating the arm $d$ which moves the string into juxtaposed position with respect to the bag.

Figure 73 is a plan view of the feeding arm shown in Figure 72.

Figure 74 is a view in side elevation showing the device of Figure 73.

Figure 75 is an assembly view of the machine looking from right to left of Figure 1.

Figure 76 is an assembly view of the complete machine from the side opposite to that from which Figure 75 is taken.

With reference particularly to Figures 1, 2, 4, 5, 6, 7, 8, 9, 10, and 11, the mechanism for everting, filling and transferring filled bags to the closing mechanism is shown in detail. This mechanism includes a filling turret $a'$ upon which relatively movable arms $a^2$ are mounted. These arms are formed with vertical bag holding fingers $a^3$ over which previously formed bags are positioned and between which a vertically movable filler tube $a^4$, connected to a rock lever $a^{40}$, is adapted to pass. As the filler tube descends between the fingers $a^3$ a charge of a suitable substance is introduced through the tube into the everted receptacle and the tube and receptacle then pass between spaced arms $b^{11}$ and $b^{13}$ which are mounted upon a transfer head $b'$. The foregoing mechanism is similar to existing forms of everting and filling mechanisms and therefore need not be described in further detail herein. Upon descending between spaced arms $b^{11}$ and $b^{13}$ the filled receptacle rests upon a table $a^5$ upon which a serrated wall $a^6$ is provided. A hollow bushing $a^7$ is provided upon the rear of the wall $a^6$ and serves as a guide for a needle $a^8$ which is secured to a rod $a^9$ which is slidably mounted in a guide bracket $a^{10}$. The rod $a^9$ is reciprocated by means of a bell crank lever $a^{11}$ which is connected to a clamp $a^{12}$ upon the rod $a^9$ by means of a pin and slot connection $a^{13}$. The lever $a^{11}$ is pivoted at $a^{14}$ and connected to a link $a^{15}$ which is pivoted to an arm $a^{16}$. The arm $a^{16}$ is pivoted at $a^{17}$ and is provided with a roller $a^{18}$ which is adapted to engage a cam $a^{19}$ secured to a power shaft 6. A spring $a^{20}$ serves to maintain the roller $a^{18}$ against the cam $a^{19}$ and in this fashion, provides a means for moving the needle $a^8$ through the wall $a^6$ to engage a filled receptacle when the latter has been placed upon the table $a^5$ by means of the filling tube $a^4$. The filling tube is provided with a notch $a^{21}$ through which the needle may pass and, in this fashion, when the filling tube rises, the bag is held in position upon the table $a^5$ preparatory to being engaged by the transfer arms $b^2$.

The transfer head $b'$ is mounted upon a collar $b^3$ which is secured to a sleeve $b^4$, journaled upon a stationary shaft $b^5$. A cog wheel $b^6$ is driven by means of a chain $b^7$ (shown in dot and dash lines in Figure 1) which is driven by the filling turret $a'$. As shown in Figures 7, 8, and 9, the transfer head is formed with top and bottom plates $b^8$ and $b^9$, respectively, the top plate $b^8$ being secured to a disc $b^{10}$ upon which arms $b^{11}$ are formed while the bottom plate $b^9$ is secured to a disc $b^{12}$ upon which arms $b^{13}$ are formed. In the construction shown, there are four spaced arms $b^{11}$ and $b^{13}$ upon the respective discs, each of the arms being spaced 90° from the other arms upon a common disc. The discs and plates $b^{10}$, $b^{12}$, $b^8$ and $b^9$ are journaled upon the sleeve $b^4$ and are driven from the collar $b^3$ by means of a pin $b^{14}$. A slot $b^{15}$ is formed in the upper plate and disc of the transfer head while a slot $b^{16}$ is formed in the lower disc and plate in order that relative movement between the arms upon the respective plates may take place. In this fashion, intermittent rotation of the sleeve $b^4$ and collar $b^3$ is transmitted to the pairs of arms $b^2$.

The pairs of arms are normally urged into closed position by means of springs $b^{16'}$ which are anchored at $b^{17}$ to the top plate $b^8$ and to pins $b^{18}$ which are secured to the bottom disc $b^{12}$ and extend through slots $b^{19}$, formed in the top plate $b^8$ and disc $b^{10}$. Each of the arms $b^{11}$ and $b^{13}$ is provided with a pin $b^{20}$ extending outwardly from the end thereof in order that the arms may be separated by means of a vertically movable wedge plate $b^{21}$, mounted upon a vertically slidable member $b^{22}$, which is actuated by means of the filler turret. The slidable member $b^{22}$ is mounted upon a guide $b^{23}$, as shown in Figure 6. When the wedge plate $b^{21}$ descends, the diverging sides thereof, shown in Figure 4, engage the pins $b^{20}$ and force the arms $b^{11}$ and $b^{13}$ apart. In this fashion, the action of the bag transfer arms is properly effected.

After the bag transfer arms have engaged a filled bag, the transfer head is turned through 90° to bring the bag so engaged into position adjacent the clamping members of a conveyor chain $c^1$. This chain is mounted over sprocket wheels $c^2$ and $c^3$ (indicated in dot and dash lines in Figure 16) and additionally passes over an idler sprocket $c^4$. Power shaft 6, which has been previously referred to, is provided with a driving sprocket $c^5$ which drives a chain $c^6$ which passes over a driven sprocket $c^7$ and an idler sprocket $c^8$. The driven sprocket $c^7$ is mounted upon a shaft $c^{8'}$ which is provided with a disc $c^9$ upon which an eccentric driving pin and roller $c^{10}$ are mounted. The driving pin and roller $c^{10}$ are adapted to engage a Geneva wheel $c^{11}$ which is mounted upon a shaft $c^{12}$, upon which the sprocket wheel $c^3$ is secured. In this fashion, the power shaft 6 serves to drive the chain $c^1$ in an intermittent fashion.

At spaced points on the chain $c^1$ blocks $c^{13}$ (Figures 12, 13 and 18) are secured, these blocks being provided with stationary bag clamping jaws $c^{14}$, the clamping surfaces of which may be serrated as shown in Figures 14 and 15. Pivoted to the relatively stationary jaws $c^{14}$ and movable jaws $c^{15}$ which are formed similarly to the stationary jaws and are provided with offset arms $c^{16}$ upon which roller bearing pins $c^{17}$ are secured. The jaws $c^{14}$ and $c^{15}$ are provided with aligned notches $c^{18}$ for a purpose to be described hereinafter, recesses $c^{19}$ being formed in the upper surfaces of each of the movable jaws $c^{15}$ to be engaged by a locking and positioning member to be described. Springs $c^{20}$ normally urge the jaws $c^{14}$ and $c^{15}$ together and in opposition to this spring, a pivoted dog $c^{21}$ is adapted to act to move the movable jaws into an open position in order that the open end of a filled receptacle may be received between the movable stationary jaws. The dog $c^{21}$ (Figures 18 and 19) is pivoted at $c^{22}$ upon a bell crank member $c^{23}$ which is journaled at $c^{24}$ and which has an arm $c^{25}$ connected to a link $c^{26}$ which is pivoted to a crank arm $c^{27}$ mounted upon pivot member $c^{28}$ which is provided with a crank arm $c^{29}$ having a roller $c^{30}$ which engages a cam $c^{31}$, secured to power shaft 6. A spring $c^{32}$ is connected to an arm $c^{33}$ which is secured to pivot member $c^{28}$ and thus urges the roller $c^{30}$ against the cam $c^{31}$. A leaf spring $c^{34}$ engages the dog $c^{21}$ to urge the same normally toward the pins $c^{17}$ as the latter move into the position shown in Figure 18. By means of the foregoing mechanism the pivoted dog is swung about the axis of $c^{24}$ and moves the movable jaw into open position. Continued rotation of the cam $c^{31}$ causes the dog $c^{21}$ to move in a clockwise rotation, as viewed in Figure 18, and permit the movable jaw to close over the open end of a receptacle which has been placed adjacent the cooperating stationary jaw.

During the movement of the dog $c^{21}$, the conveyor chain is maintained in a fixed position by means of a locking pin $c^{35}$ (see Figures 18, 20 and 21) which is mounted upon an arm $c^{36}$, secured to the arm $c^{33}$ of the pivot shaft $c^{28}$. This pin is adapted to engage the recess $c^{19}$ of a movable jaw which has been placed thereunder and, in this fashion, the chain is locked against movement until the cam $c^{31}$ elevates the arm $c^{36}$ and releases the movable jaw.

While the conveyor chain is held in a fixed position by the locking mechanism above described, a tag bearing string is drawn through the bag and looped by the mechanism shown in Figures 22 through 32. This mechanism includes a swinging arm $d$ which is adapted to engage a string fed thereto by suitable mechanism which is now in common use. The arm $d$ is adapted to swing over the adjacent bag which is held between the clamping jaws $c^{14}$ and $c^{15}$ and position the string over the recessed portions $c^{18}$ thereof. By placing a predetermined frictional drag upon the tag secured to the free end of the string, the arm $d$ serves to hold the string over the adjacent clamping jaws and thus position it properly for the looping operation to be performed thereon. This structure is shown and described in Letters Patent of the United States No. 1,955,808, issued to Millie Patent Holding Co., Inc., as assignee of Louis Hirschhorn and Hans Irmscher.

Beneath the table $d'$ of the machine, a needle $d^2$ is mounted with provision for reciprocating motion in a vertical plane. This needle is formed with a recessed or hooked portion $d^3$ and is adapted to pass through an aperture $d^4$ in the table $d'$ and through the recessed portion $c^{18}$ of the clamping jaws. After passing through such recessed portions and the bag secured therein, the needle lies adjacent a length of string $d^5$ (Figures 30 and 31). The string is then moved against the shank of the needle and bent therearound by means of an arm $d^6$ which is pivotally mounted at $d^7$ and is actuated by a link $d^8$ which is connected to a crank arm $d^9$, pivoted at $d^{10}$, and provided with a roller $d^{11}$ which engages a cam $d^{12}$ mounted upon the power shaft 6. A spring $d^{13}$ normally urges the roller $d^{11}$ against the cam and thus maintains the lever $d^6$ in proper position during actuation of the mechanism. Upon the end of lever $d^6$ adjacent the arm $d$, an offset extension $d^{14}$ is formed. A second arm $d^{65}$ on the arm $d^6$ is provided with a friction tongue $d^{15}$ which is urged against the arm $d^{14}$ to serve as a friction grip for the string. An additional extension $d^{16}$ is secured to the arm $d^6$ and is provided with a curved arm $d^{17}$ upon which is provided a string engaging member $d^{18}$. Upon clockwise movement of the arm $d^6$ from the position shown in Figure 30 to the position shown in Figure 31, the string engaging members $d^{15}$ and $d^{18}$ engage the string held by the arm $d$ and move it against the needle $d^2$ in order that the needle hook may effectively engage the string upon downward motion of the needle. The details of construction of the swinging arm $d$ by which the string is placed in juxtaposed position with respect to the bag, its associated parts and actuating mechanism, are shown in Figures 72-74. The arm, which is adapted to grasp the string, supplied from a spool not shown, comprises an arm $d^{70}$ which is pivoted at $d^{71}$ to an arm $d^{72}$ journaled at $d^{73}$ upon a stationary bracket or standard $d^{74}$. Arm $d^{70}$ is moved by an arm $d^{75}$ having an offset $d^{97}$ which is pivotally secured to the lower portion of arm $d^{70}$. In this fashion, the lower extremity of arm $d^{70}$ moves in an arcuate path defined by the swinging of arm $d^{75}$ about its pivot $d^{98}$. This pivot comprises a shaft $d^{99}$ upon which is secured a lever $d^{79}$ having a slotted extremity $d^{80}$ in which a pivot shaft $d^{81}$ is adjustably secured. Pivot shaft $d^{81}$ journals a fitting $d^{82}$ in which an end of a link $d^{83}$ is secured.

Arm $d^{70}$ is formed with an offset portion $d^{84}$ on which a relatively stationary finger $d^{85}$ is secured. A movable finger $d^{86}$ is pivotally mounted on shaft $d^{87}$ and is normally urged against finger $d^{85}$ by spring $d^{88}$. The movable finger $d^{86}$ is formed with a yoke shaped extremity one arm $d^{90}$ of which is extended and pivotally connected to a link $d^{91}$. The stationary finger $d^{85}$ is provided with an offset flange $d^{92}$ while movable finger $d^{86}$ is provided with an offset flange $d^{93}$. By means of the flanges and relatively movable fingers, the string is gripped by arm $d$ to enable the string to be effectively moved into the closing mechanism. As arm $d$ swings to the right, as viewed in Figure 72, to grasp the string, link $d^{91}$ moves the finger $d^{86}$ into an open position and, when the arm $d$ has finally moved into such position that the string lies between the fingers, link $d^{91}$ enables spring $d^{88}$ to move finger $d^{86}$ in the reverse direction in order that the string may be clamped between the fingers $d^{85}$ and $d^{86}$.

Reciprocating motion is imparted to link $d^{83}$ by means of boxed cam $d^{78}$ which is mounted on shaft 3. A box $d^{76}$ is pivoted at $d^{77}$ on a bracket $d^{96}$ and mounted over cam $d^{78}$, link $d^{83}$ being connected to the box at $d^{96}$.

In order that the needle may be suitably actuated the mechanism shown in Figures 22, 23, and 24 is provided, this mechanism including a quill $d^{19}$ which is slidable over the needle $d^2$ and provided with a point adapted to pierce the fabric of the bag. The quill and needle move simultaneously upwardly through the bag and after the quill reaches its uppermost position the needle $d^2$ continues to move upwardly in order that its hook may be exposed to engage the string. The needle then moves downwardly into the quill and the hook of the needle is thus protected against further engagement with the adjacent portions of the bag. After the quill and needle have been drawn through the bag and reach their lowermost position, the needle moves upwardly to expose the needle hook and permit the loop to be withdrawn therefrom.

In order that the motion of the quill and needle may be suitably controlled, the needle is mounted upon a head $d^{20}$ (Figure 24) which is secured to a guide $d^{21}$, slidably mounted in bracket $d^{22}$. A link $d^{23}$ is pivoted at $d^{24}$ to an arm $d^{25}$ of a bell crank lever $d^{26}$. The bell crank lever $d^{26}$ is pivoted at $d^{27}$ to an arm $d^{28}$ which is pivoted at $d^{29}$. The other arm of the bell crank lever $d^{26}$ is pivoted to a link $d^{30}$ which is connected to a crank arm $d^{31}$ which is driven by a power shaft $d^{32}$. Bell crank $d^{26}$ thus is a floating lever having movement about pivot points $d^{27}$ and $d^{29}$. Motion is imparted to the bell crank lever $d^{26}$ not only by the crank arm $d^{31}$ but also by a cam $d^{33}$ which is mounted upon power shaft 6 and is engaged by a roller $d^{34}$ journaled upon arm $d^{28}$, a spring $d^{35}$ serving to maintain the roller in engagement with the cam $d^{33}$.

The quill $d^{19}$ is mounted upon a head $d^{36}$ which is slidably mounted in the bracket $d^{22}$. A link $d^{37}$ connects the head $d^{36}$ to one arm of a bell crank lever $d^{38}$ which is pivoted at $d^{39}$, the other end of the bell crank lever $d^{38}$ being connected to a link $d^{40}$ which is connected to the crank arm $d^{31}$. As the crank arm $d^{31}$ rotates, the quill $d^{19}$ thus partakes of simple reciprocating motion in accordance with the motion of the crank $d^{31}$. The needle $d^2$ also partakes of this motion but is supplemented by the motion imparted thereto by the cam $d^{33}$. In this manner, the needle and quill are actuated to produce the operation, noted above, as drawing the string through the bag and releasing the looped end thereof.

In order that the looped end of the string may be moved in such fashion that the free end of the string may be drawn therethrough to complete the tying of a knot, spaced spring fingers $d^{41}$ are provided, the ends of which are formed with hooks $d^{42}$. These spring fingers $d^{41}$ are mounted upon a plate $d^{43}$ which is provided with aligned slots $d^{44}$ and $d^{45}$ and a slot $d^{46}$ which is parallel to the aligned slots. Each of the slots $d^{44}$, $d^{45}$ and $d^{46}$ is engaged by a respective roller $d^{47a}$, $d^{47b}$, $d^{47c}$ which is mounted upon a respective stub shaft $d^{48a}$, $d^{48b}$, $d^{48c}$ mounted eccentrically on a respective gear $d^{49a}$, $d^{49b}$, $d^{49c}$. All of the gears $d^{49a}$, $d^{49b}$ and $d^{49c}$ engage a master gear $d^{50}$. Rotation of gear $d^{50}$ thus produces a rocking motion of the plate $d^{43}$ and causes the fingers $d^{41}$ to move toward and away from the needle $d^2$. In order that the fingers $d^{41}$ may be swung upwardly through the aperture $d^4$ after they have engaged the loop and removed the same from the hook of the needle $d^2$, a slot $d^{51}$ is formed in the plate $d^{43}$ and is engaged by a bushing $d^{52}$ which is journaled upon a stub shaft $d^{53}$, mounted eccentrically upon gear $d^{50}$. As the gear $d^{50}$ rotates, the bushing $d^{52}$ slides in the slot $d^{51}$ and rocks the plate to cause the fingers $d^{41}$ to be moved vertically. By means of the foregoing operating mechanism the fingers $d^{41}$ are swung through substantially a semi-circle, the center of which is approximately the point of the bag through which the string has been drawn and the arc of which terminates, at one end, with the needle beneath the bag, and at the other end, with the plane of the arm $d$ above the bag.

The spring fingers $d^{41}$ are separated by means of a cam $d^{54}$ which is mounted upon a shaft $d^{55}$, journaled upon a bracket $d^{56}$, mounted upon the plate $d^{43}$. A crank arm $d^{57}$ is secured to the shaft $d^{55}$ and is engaged by a cam $d^{58}$ which is formed upon a shaft $d^{59}$. Shaft $d^{59}$ is journaled and slidably mounted in a shaft $d^{60}$ which is journaled upon the plate $d^{43}$ (see Figures 25, 26 and 27). The lower end of shaft $d^{59}$ is pinned to a sleeve $d^{61}$ which is driven by a bevel gear $d^{62}$ engaged by a cooperating bevel gear $d^{63}$ secured to shaft $d^{53}$. The sleeve $d^{61}$ is centered properly by means of a guide rod $d^{64}$ which is journaled upon shaft $d^{53}$. In this fashion, the sleeve $d^{61}$ follows the motion of the shaft $d^{53}$ as it moves with the gear $d^{50}$. Inasmuch as such motion is concentric with respect to the axis of shaft $d^{60}$ relative rotation will take place between the gears $d^{62}$ and $d^{63}$ and the cam $d^{58}$ will be actuated to operate the cam $d^{54}$. The construction is such that the spring fingers $d^{41}$ are separated as they approach the needle $d^2$ and also as they approach the string carried by the friction tongue $d^{15}$. The spring fingers thus straddle the needle $d^2$ and upon movement away from the needle, engage and remove the loop therefrom. Continued swinging motion of the spring fingers moves the hooks $d^{42}$ thereof through the loop and causes the same to engage the end of the string which has been released by the arm $d$. After such engagement, the spring fingers $d^{41}$ swing down through the loop, carrying the end of the string therethrough and completing the knot. The various positions of the string and the operating elements are clearly illustrated in Figures 57–61. The chain conveyor then moves through another step to place another bag beneath the looping and tying device, above described. The relative positions of the quill, needle and spring fingers, at each successive step of the knot tying operation, are illustrated in Figures 54–61, while Figure 62 shows the knot as partly formed in the step illustrated in Figure 60, and Figure 63 shows the knot in final form.

The gear $d^{50}$ is mounted upon a shaft $d^{66}$ to which is secured a pinion $d^{67}$ (see Figures 27, 28 and 29). This pinion is driven by gear $d^{68}$ which is driven by the power shaft 6. The gear $d^{68}$ and pinion $d^{67}$ are mutilated in order that the movement of spring fingers $d^{41}$ may be interrupted during movement of the conveyor chain. A mutilated gear $d^{69}$ is secured to the gear $d^{68}$ and drives a mutilated pinion $d^{63}$ mounted upon the shaft $d^{32}$, the power for actuating the knot tying mechanism thus being derived completely from the power shaft 6.

After the string is looped and tied to the bag, the chain conveyor carries the bag forward and places the same under a secondary chain conveyor which passes the bag through a sewing machine to close the open end thereof. The looped and tied portion of the string is included under the stitching of this sewing machine in order that the loop may be effectively anchored to the bag. As will be seen by reference to Figures 45, 46 and 47 the conveyor $c$ moves the bags (indicated by dotted lines) under the end of conveyor $e$ which passes over the sprocket wheel $e^2$. The latter is elevated, as shown in Figure 45, to permit the bag to be moved thereunder, and when the sprocket wheel is lowered the bag then becomes engaged by the conveyor $e$. This chain conveyor is mounted over sprocket wheels $e'$ and $e^2$, sprocket wheel $e^2$ being the driving sprocket and mounted upon an arm $e^3$ which is pivoted at $e^4$ upon a stationary bracket $e^5$. A shaft $e^6$ is journaled in arm $e^3$ and is driven through a suitable splined and universal connection $e^7$ from a shaft $e^8$ which is driven by a shaft $e^9$ through gearing $e^{10}$. Shaft $e^9$ is driven by a shaft $e^{11}$ which receives power from a gear connection $e^{12}$ mounted upon the shaft $c^{8\prime}$. In order that the driving sprocket $e^2$ may be lifted so that a bag may be moved thereunder, a link $e^{13}$ is connected to the arm $e^3$. This link is pivoted to a lever $e^{14}$ (Figure 43), journaled at $e^{15}$ and provided, at its other end, with a roller $e^{16}$ which engages a cam $e^{17}$, mounted upon power shaft 7. A spring $e^{18}$ maintains roller $e^{16}$ in engagement with the cam $e^{17}$ and thus causes the sprocket wheel $e^2$ and chain mounted thereover to be lifted periodically. The lifting motion of these elements is timed in accordance with the movement of the first conveyor chain and thus permits bags to be moved under the secondary chain at the proper times during the operation of the machine. A leaf spring $e^{19}$ (Figure 45) is provided to maintain the secondary conveyor chain upon a table $e^{20}$ over which the bags pass, spikes $e^{21}$ being formed upon each link of the secondary conveyor chain in order that the bags may be moved positively with the chain. As the bags are moved to the secondary conveyor, a cam $e^{26}$ (Figure 47) engages the pins $c^{17}$ (Figure 18) to release the bags from the clamping jaws $c^{14}$ and $c^{15}$.

Inasmuch as it is desired that a bag previously placed under the secondary conveyor chain may not be disengaged therefrom during the lifting of the sprocket wheel $e'$, a presser foot $e^{22}$ (Figures 45 and 46) is provided, the foot being pivoted at $e^{23}$ and actuated by a link $e^{24}$ which is connected to the link $e^{13}$. The presser foot moves through an aperture $e^{25}$ in the table $e^{20}$ and follows the secondary conveyor chain upwardly to maintain the adjacent bag in engagement with the spikes of the chain.

In order that the tags which have been secured to the respective bags may be moved with the bags and not become entangled with adjacent strings and tags, a tag guiding and moving mechanism is provided and is shown in detail in Figures 1 and 33 through 42, as well as Figures 44 and 47. This mechanism includes a swinging arm $f$ which is pivoted at $f'$ and actuated by a cam $f^2$, mounted upon power shaft 6. The cam $f^2$ engages a roller $f^3$ which is journaled upon a crank arm $f^4$, pivoted at $f^5$ and connected to a link $f^6$ which is connected to an arm $f^7$ secured to the arm $f$. A spring $f^8$ normally maintains the roller $f^3$ in engagement with the cam $f^2$.

The free end of the arm $f$ is formed with a curved extension $f^9$ upon the underside of which is formed a string engaging projection $f^{10}$ and a recess $f^{11}$. As the arm $f$ moves in a clockwise direction as viewed in Figure 34, the end of the extension $f^9$ passes over the string. Upon movement of the arm in the opposite direction, the string is engaged by the projection $f^{10}$ and is received within the notch $f^{11}$. This draws the tag into the position shown in Figure 33. The arm then moves into the position shown in dotted lines in Figure 34 carrying the tag with it, passing out from beneath a guide rail $f^{12}$ and beneath a friction tag moving means, shown in Figures 36 through 42.

The friction tag moving means shown in Figures 36 through 42 includes a head formed with a plurality of arms $g$ to the lower ends of which friction pads $g'$ are secured. These pads may be clamped between spaced side portions $g^2$ of the arms $g$ and are adapted to engage the tags as they pass out from under the tag guiding rail above referred to. The arms $g$ are pivoted to links $g^3$ which are pivoted upon a head $g^4$ which is rotatably mounted upon a relatively stationary shaft $g^5$. The upper ends of the arms $g$ are formed with slots $g^6$ which cooperate with pins $g^7$ to connect the arms $g$ pivotally with links $g^8$. Links $g^8$ are pivotally connected to the rotatable head $g^4$ and springs $g^9$ are provided to urge the arms $g$ normally toward the head $g^4$.

Movement of the arms $g$ about the pivot mountings thereof is controlled by means of upper and lower cams $g^{10}$ and $g^{11}$, respectively. These cams are fixedly secured to the shaft $g^5$ and are engaged by shoulders $g^{12}$ and $g^{13}$, respectively, to move the respective links and arms pivotally.

Rotation of the head $g^4$ and arms $g$ is effected by means of a spring pressed latch $g^{14}$ which is provided with a sloping upper surface $g^{15}$ to adapt it to reach under the shoulders $g^{13}$ of links $g^3$, when moved in one direction and to engage such shoulders upon movement in the other direction. The latch $g^{14}$ is mounted upon arms $g^{16}$ which are journaled upon the stationary shaft $g^5$, the arms $g^{16}$ having a body portion $g^{17}$ secured thereto in which the spring pressed latch $g^{14}$ is slidably received. The body $g^{17}$ is provided with spaced outwardly extending arms $g^{18}$ between which the spherical extremity $g^{19}$ of a lever arm $g^{20}$ is received. Lever arm $g^{20}$ forms one extremity of a bell crank lever $g^{21}$ which is connected to a link $g^{22}$ and is pivoted upon a stationary axis formed by shaft $g^{23}$. The link $g^{22}$ is connected to one arm of a bell crank lever $g^{24}$ (Figure 44) which is pivoted at $g^{25}$ and provided with a roller $g^{26}$ which is actuated by a cam $g^{27}$, secured to power shaft 7. A spring $g^{28}$ normally urges the roller against the cam and thus causes the spherical extension $g^{19}$ to be oscillated to advance the head in a step by step fashion about the axis of the shaft $g^5$. The cams $g^{10}$ and $g^{11}$ are so formed as to cause the friction pads $g^1$ to descend upon a tag which has been moved from beneath the tag guide rail and advance the same over a curved tag table $g^{29}$. As the head continues to turn, the tag leaves the table $g^{29}$ and is placed upon the bag to which it has been secured and which is now advancing under the secondary conveyor chain $e$, as previously described.

Continued movement of the bags under the secondary conveyor chain moves the open ends thereof under a sewing machine $h$ (Figures 1 and 47) which sews the open ends thereof shut and anchors the previously formed loop in the tag bearing string effectively to its bag.

As the bags move from the sewing machine $h$ and while under the secondary conveyor chain, the continuously formed stitches which connect successive bags are cut by a mechanism shown in detail in Figures 48, 49, 50 and 51. This mechanism includes a V-shaped relatively stationary cutting member, the apex of which extends upwardly. This cutting member is formed by two relatively fixed cutter blades $i$ which are secured to a head $i^1$ and to which movable cutter blades $i^2$ are pivoted by shafts $i^3$. Springs $i^4$ normally urge the movable blades against the stationary blades. The movable blades $i^2$ are connected pivotally at $i^5$ to the spaced extensions $i^6$ upon parallel links $i^7$ which are pivoted at $i^8$ to a bell crank lever $i^9$. The bell crank lever is pivoted at one end upon a shaft $i^{10}$ which is secured between arms $i^{11}$ and is connected, at its other end, to a link $i^{12}$ which is connected at its other end to a crank arm $i^{13}$ which is secured to a shaft $i^{14}$. Shaft $i^{14}$ is rocked by a crank arm $i^{15}$ which is connected to a link $i^{16}$ pivoted to the extremity of a crank arm $i^{17}$ at $i^{18}$. Crank arm $i^{17}$ is secured to power shaft 3 which drives power shaft 7 by means of gears $i^{19}$. Reciprocation of the link $i^{12}$ thus causes the movable cutter blades to be moved relatively to the stationary cutter blades with a shearing movement and thus provides a cutting action of the mechanism at the proper time. It will be noted that the friction pads $g^1$ cooperate with the table 29, engaging the tags supported thereon and causing them to slide over the table toward the secondary conveyor by which the bags and the tags are conveyed first to the sewing mechanism and then to the thread cutting mechanism. In the continued movement of the bags the sewing thread, which connects successive bags, is moved into position with respect to the cutting mechanism above described and is severed thereby. Thereafter the discharge of the bag is effected by the discharge member hereinafter described in some detail. To enable the relation of the discharge member to be understood it may be said at this point that the arm $k^1$ of the discharge member is held frictionally by the spring $k^{15}$ in any position in which it is left through contact of the end of the arm with the table of the discharge member or with the horizontal cam surface $k^{16}$ which overlies the end of the arm $k^2$, such horizontal cam surface being spaced somewhat from the table of the discharge member. In the counterclockwise movement of the arm $k^4$, the end of the arm $k^1$, being then moved to the right hand in Figure 52, obviously will be swung upward away from the bag conveyor chain, the frictional mounting of the arm $k^1$ on the arm $k^4$ then permitting the arm to yield and swing slightly on its pivot $k^3$. In the clockwise movement of the arm $k^4$ the end of the arm $k^1$ will swing downward and will engage the bag next in position on the carrier and the bag, as it is released from the carrier, will be drawn to the left hand, as seen in Figure 52. This operation will be further described hereinafter.

In order that the cutting mechanism may be moved upwardly into engagement with the thread to be cut and between successively sewed bags, the head $i^1$ is mounted upon the arms $i^{11}$ which are pivoted upon a horizontal axis $i^{21}$ upon a standard $i^{22}$ which is pivoted upon a vertical axis $i^{20}$. A link $i^{23}$ is pivoted to arms $i^{11}$ and, at its other end, is pivoted to a link $i^{24}$ which is pivoted at $i^{25}$ and provided with a roller $i^{26}$ which rests upon the upper surface of a crank $i^{27}$ secured to shaft $i^{14}$. As the shaft $i^{14}$ reciprocates the link $i^{23}$ the latter lifts the head $i^1$ into engagement with the thread between successive bags.

In order that the cutting mechanism may be moved to enable the head $i^1$ to follow the motion of the bags under the secondary conveyor chain, the link $i^{23}$ is rocked by means of a link $i^{28}$ which is pivoted thereto at $i^{29}$ and to a bell crank lever $i^{30}$. The bell crank lever is pivoted at $i^{32}$ and at the other end thereof is connected to a link $i^{33}$ which is pivotally connected to a bell crank lever $i^{34}$. Bell crank lever $i^{34}$ is pivoted at $i^{35}$ and provided with a roller $i^{36}$ which is adapted to engage a cam $i^{37}$, secured to the power shaft 7. A spring $i^{38}$ maintains the roller $i^{36}$ normally in engagement with the cam $i^{37}$ and, upon rotation of the power shaft 7, the link $i^{23}$ is thus rocked to move the head $i^1$ in accordance with the motion of the bags in the secondary conveyor chain. The cutting mechanism is elevated between successively sewed bags as shown in dotted lines in Figure 49. The bags are prevented from being lifted by backing arms $i^{39}$ which are secured to the standard $i^{22}$. As the head $i^1$ and arms $i^{11}$ rise, the upper surface of one of the arms $i^{11}$ engages an offset arm $i^{40}$ which is formed upon an arm $i^{41}$, connected to a saddle $i^{43}$ which is pivoted to the arms $i^{39}$. This saddle carries a finger $i^{44}$ provided with a rearwardly extending arm $i^{45}$, a spring $i^{46}$ being provided to urge the arm $i^{41}$ and extension $i^{40}$ into engagement with the link $i^{20}$. The finger $i^{44}$ is thus moved downwardly as the link $i^{23}$ and cutting members are moved upwardly and causes the stitches between successively sewed bags to be moved into the cutting mechanism, thus insuring the effective cutting of the stitches. Since the cutting blades are V-shaped, two cutting operations are performed simultaneously, the wedging effect of the cutting blades being such as to cause the stitches connecting successively sewed bags to be severed immediately adjacent the respective bags.

As the bags continue to move under the secondary chain conveyor $e$, they advance into a discharging member $k$ (Figures 1, 52 and 53) and are engaged by an arm $k^1$ which is formed with a hooked portion $k^2$. The arm $k^1$ is pivoted at $k^3$ to a lever $k^4$ which is pivoted at $k^5$. A link $k^6$ connects the lever $k^4$ with a bell crank $k^7$ pivoted at $k^8$. The bell crank $k^7$ is also pivotally connected to a link $k^9$ which is pivoted at $k^{10}$ to one arm of a bell crank lever $k^{11}$. The other end of the bell crank lever is provided with a roller $k^{12}$ which engages a cam $k^{13}$ secured to power shaft 7. A spring $k^{14}$ normally urges the roller $k^{12}$ against the cam $k^{13}$ and thus as the cam $k^{13}$ is rotated, the lever $k^4$ is rocked about its pivot point $k^5$. A leaf spring $k^{15}$ engages the side of the arm $k^1$ and holds the same frictionally in any position to which it has been moved with respect to the lever $k^4$. As shown in Figure 52, the arm $k^1$ is elevated above the discharge member $k$ when the link $k^4$ is advanced in a counterclockwise direction as viewed in Figure 52 until the end of the arm strikes and slides against the horizontal cam ledge $k^{16}$, the arm being thus compelled to swing down on its pivot $k^3$. Upon rocking of the lever $k^4$ in the reverse direction (clockwise) the hook $k^2$ of the arm $k^1$ swings down into engagement with a bag which has been advanced into discharge member $k$ and upon continued movement of the lever $k^4$ in a clockwise direction discharges the bag from the member $k$. The discharge member $k$ is provided with a cam surface $k^{16}$ against which the upper and outer extremity of the arm $k^1$ engages as the link $k^4$ moves to its extreme right hand position as viewed in Figure 52. Continued movement of the link $k^4$ causes the angle between the link $k^4$ and arm $k^1$ to become more obtuse, thus throwing the end of the arm $k^1$ downward in order that it may be in position to engage the next bag when the arm $k^4$ swings in the reverse direction. The hooked extremity of arm $k^1$ rides along the discharge member $k$ carrying the bag with it to the end of the discharge member and then moves in fixed relation with the lever $k^4$ until, upon the reverse direction of motion of lever $k^4$, the end of the arm $k^1$ engages the cam surface $k^{16}$. The position of the arm $k^1$ as it moves a bag through the discharge member $k$ is shown in dotted lines in Figure 52.

While the invention has been described with specific reference to the accompanying drawings, it is not to be limited, save as defined in the appended claims.

I claim as my invention:

1. Means for closing filled tea bags and the like comprising a bag conveying means, means to draw strings through bags to loop and tie the strings to bags on the conveying means, and means to sew the bags closed over the tie of the strings which have been tied to the bags.

2. Means for transferring bags from a filling to a closing device comprising a head, means to move the head, a plurality of pairs of arms on the head, a disc upon which one arm of each pair is mounted, a disc upon which the other arm of each pair is mounted, said discs being mounted rotatably on the head, means to urge the arms together, and means to drive the arms by the head.

3. Means for transferring bags from a filling to a closing device comprising a head, means to move the head, a plurality of pairs of arms on the head, a disc upon which one arm of each pair is mounted, a disc upon which the other arm of each pair is mounted, said discs being mounted rotatably on the head, means to urge the arms together, means to drive the arms by the head, projections on the ends of the arms, and a wedge to engage and separate the projections and arms.

4. Means for closing filled tea bags and the like comprising a conveyor, stationary and movable bag clamping jaws on the conveyor, means to actuate the movable jaws, and means to hold the conveyor against movement during actuation of the movable jaw.

5. Means for closing filled tea bags and the like comprising a conveyor, stationary and movable bag clamping jaws on the conveyor, means to actuate the movable jaws, said jaws being formed with aligned recesses, means cooperating with the recesses for performing an operation upon the bags, and means to hold the conveyor against movement during actuation of the movable jaws.

6. Means for closing filled tea bags and the like, comprising a conveyor, stationary and movable bag clamping jaws on the conveyor, means to actuate the movable jaws, said jaws being formed with aligned recesses, means to hold the conveyor against movement during actuation of the movable jaws, means to move a string over the recesses of one pair of jaws, and means to insert a needle through the recesses to engage the string.

7. Means for closing filled tea bags and the like comprising a conveyor, stationary and movable bag clamping jaws on the conveyor, means to actuate the movable jaws, said jaws being formed with aligned recesses, means to hold the conveyor against movement during actuation of the movable jaw, means to move a string over the recesses of one pair of jaws, means to insert a needle through the recesses, and means to move the string into engagement with the needle.

8. Means for closing filled tea bags and the like comprising means to hold a bag, means to move a string into juxtaposed position with respect to the bag, a needle, means to reciprocate the needle through the held bag, means to move the string into engagement with the needle when the latter is inserted through the bag, spring fingers having hooked extensions thereon, means to move the fingers to engage the loop formed by the needle when the needle leaves the bag, and means to move the fingers into engagement with the end of the string and draw the said end through the loop.

9. Means for closing filled tea bags and the like comprising means to hold a bag, means to move a string into juxtaposed position with respect to the bag, a needle, means to reciprocate the needle through the held bag, means to move the string into engagement with the needle when the latter is inserted through the bag, spring fingers having hooked extensions thereon, means to move the fingers to engage the loop formed by the needle when the needle leaves the bag, means to move the fingers into engagement with the end of the string and draw the end through the loop, and means to separate the fingers.

10. Means for closing filled tea bags and the like comprising means to hold a bag, means to move a string into juxtaposed position with respect to the bag, a needle, means to reciprocate the needle through the held bag, means to move the string into engagement with the needle when the latter is inserted through the bag, spring fingers having hooked extensions thereon, means to move the fingers to engage the loop formed by the needle when the needle leaves the bag, means to move the fingers into engagement with the end of the string and draw the said end through the loop, and means to separate the fingers during movement toward and away from the needle and close the fingers upon the said end of the string as the fingers move thereto.

11. Means for closing filled tea bags and the like comprising means to hold a bag, means to move a string into juxtaposed position with respect to the bag, a needle, a quill over the needle, means to move the needle and quill through the bag, means to move the needle with respect to the quill and adjacent the string to engage the same, said means subsequently returning the needle into the quill, the needle and quill moving means subsequently withdrawing the needle and quill from the bag and moving the needle with respect to the quill to release the string engaged thereby.

12. Means for closing filled tea bags and the like comprising means to hold a bag, means to move a string into juxtaposed position with respect to the bag, a needle, a quill over the needle, a power source, means actuated by the power source for reciprocating the quill, a floating lever actuated by the power source for reciprocating the needle, a lever upon which the first lever is pivoted, said second lever being mounted upon a fixed pivot, and means to rock the second lever.

13. Means for closing filled tea bags and the like comprising means to hold a bag, means to move a string into juxtaposed position with respect to the bag, a needle, means to reciprocate the needle through the held bag, spring fingers to engage the loop formed when the needle is withdrawn from the bag, a cam to space the fingers apart, means to rock the fingers, and means to actuate the cam.

14. Means for closing filled tea bags and the like comprising means to hold a bag, means to move a string into juxtaposed position with respect to the bag, a needle, means to reciprocate the needle through the held bag, spring fingers to engage the loop formed when the needle is withdrawn from the bag, a cam to space the fingers apart, a plate upon which the fingers are mounted, means to move the plate and fingers toward and away from the needle, and means to rock the fingers across the plane of the bag.

15. Means for closing filled tea bags and the like comprising means to hold a bag, means to move a string into juxtaposed position with respect to the bag, a needle, means to reciprocate the needle through the held bag, spring fingers to engage the loop formed when the needle is withdrawn from the bag, a cam to space the fingers apart, a plate upon which the fingers are mounted, means to move the plate and fingers toward and away from the needle, and means to rock the fingers across the plane of the bag, and actuate the finger spacing cams.

16. Means for closing filled tea bags and the like comprising means to hold a bag, means to move a string into justaposed position with respect to the bag, a needle, means to reciprocate the needle through the held bag, spring fingers to engage the loop formed when the needle is withdrawn from the bag, a cam to space the fingers apart, a plate upon which the fingers are mounted, means to move the plate and fingers toward and away from the needle, an eccentric crank shaft, said plate having a slot in which the last named crank shaft is received, and means to actuate the finger spacing cams by the crank shaft.

17. Means for closing filled tea bags and the like comprising means to hold a bag, means to move a string into juxtaposed position with respect to the bag, a needle, means to reciprocate the needle through the held bag, spring fingers to engage the loop formed when the needle is withdrawn from the bag, a cam to space the fingers apart, a plate upon which the fingers are mounted, means to move the plate and fingers toward and away from the needle, an eccentric crank shaft, said plate having a slot in which the last named crank shaft is received, a bevel gear on the crank shaft, a shaft journaled swingingly upon the plate and provided with a bevel gear splined thereto and engaging the first bevel gear, and means to actuate the finger spacing cam by the last named shaft.

18. In combination with means for attaching a tag bearing string to a bag and subsequently conveying the bag to a discharge member, a tag moving means, means on the last named means for engaging the string of a bag, and means on the moving means for receiving and holding a tag.

19. In combination with means for attaching a tag bearing string to a bag and subsequently conveying the bag to a discharge member, a tag moving arm, a string engaging projection on the underside of the arm, and a recess between the projection and arm to serve as a tag seat.

20. In combination with means for attaching a tag bearing string to a bag and subsequently conveying the bag to a discharge member, a tag moving means comprising a friction tag driving head, means to move the head, tag engaging means on the head, and means to move the last named means into engagement with a tag.

21. In combination with means for attaching a tag bearing string to a bag and subsequently conveying the bag to a discharge member, a tag moving means comprising a rotatable friction tag driving head, means to move the head in a step by step fashion, friction tag engaging means on the head, and means to move the last named means into engagement with a tag.

22. In combination with means for attaching a tag bearing string to a bag and subsequently conveying the bag to a discharge member, a tag moving means comprising a rotatable friction tag driving head, means to move the head in a step by step fashion, arms provided with friction tag engaging feet, a plurality of links pivotally connecting each arm with the head, and means to move each link pivotally.

23. In combination with means for attaching a tag bearing string to a bag and subsequently conveying the bag to a discharge member, a tag moving means comprising a rotatable friction tag driving head, means to move the head in a step by step fashion, arms provided with friction tag engaging feet, a plurality of links pivotally connecting each arm with the head, and separate means to move each link pivotally.

24. In combination with means for attaching a tag bearing string to a bag and subsequently conveying the bag to a discharge member, a tag moving means comprising a rotatable friction tag driving head, means to move the head in a step by step fashion, arms provided with friction tag engaging feet, a plurality of links pivotally connecting each arm with the head, one of said links being connected to the arm by a pin and slot connection, shoulders on each of the links, and separate cams engaging the respective links.

25. In combination with means for attaching a tag bearing string to a bag and subsequently conveying the bag to a discharge member, a tag moving means comprising a rotatable friction tag driving head, means to move the head in a step by step fashion, arms provided with friction tag engaging feet, a plurality of links pivotally connecting each arm with the head, one of said links being connected to the arm by a pin and slot connection, shoulders on each of the links, and separate stationary circular cams engaging the shoulders and mounted coaxial to the head.

26. In combination with a bag conveyor and a discharge member associated therewith, an arm having a bag engaging hook thereon, an arm upon which the first arm is pivoted, means to rock the second arm, and a cam surface on the member lying across the path of movement of the first arm.

27. In combination with a bag conveyor and a discharge member associated therewith, an arm having a bag engaging hook thereon, an arm upon which the first arm is pivoted, means to rock the second arm, friction means between the two arms to resist relative movement therebetween, and a cam surface on the member lying across the path of movement of the first arm.

28. In combination with a bag conveyor and a discharge member associated therewith, an arm having a bag engaging hook thereon, an arm upon which the first arm is pivoted, means to rock the second arm, friction means between the two arms to resist relative movement therebetween, and a cam surface on the member above the path of movement of the bags on the conveyor and lying across the path of movement of the first arm, whereby the said first arm engages the cam surface and is moved pivotally with respect to the second arm to increase the radius of movement of the bag engaging hook to cause a bag to be engaged at the end of the conveyor and removed from the discharge member.

29. Means for closing filled tea bags and the like comprising means to hold a bag, means to move a string into juxtaposed position with respect to the bag, means to reciprocate a needle through the held bag, an arm mounted to swing into engagement with the string and having spaced string engaging means, one of the last named means including cooperating extensions one of which is formed with a friction tongue to engage the other extension.

WALTER M. INGRAM.